United States Patent
Nagasawa

(10) Patent No.: US 8,960,044 B2
(45) Date of Patent: Feb. 24, 2015

(54) MANUFACTURING METHOD FOR A STEERING COLUMN, AND STEERING APPARATUS THAT USES THAT STEERING COLUMN

(75) Inventor: Makoto Nagasawa, Gunma (JP)

(73) Assignee: NSK, Ltd. (JP)

( * ) Notice: Subject to any disclaimer, the term of this patent is extended or adjusted under 35 U.S.C. 154(b) by 0 days.

(21) Appl. No.: 13/810,909

(22) PCT Filed: Jul. 23, 2012

(86) PCT No.: PCT/JP2012/068619
§ 371 (c)(1),
(2), (4) Date: Apr. 5, 2013

(87) PCT Pub. No.: WO2013/015254
PCT Pub. Date: Jan. 31, 2013

(65) Prior Publication Data
US 2014/0150596 A1 Jun. 5, 2014

(30) Foreign Application Priority Data

Jul. 26, 2011 (JP) .................................. 2011-162686
Jul. 26, 2011 (JP) .................................. 2011-162689
Aug. 22, 2011 (JP) .................................. 2011-180405

(51) Int. Cl.
*B62D 1/16* (2006.01)
*B22D 19/04* (2006.01)
*B22D 19/00* (2006.01)

(52) U.S. Cl.
CPC *B62D 1/16* (2013.01); *B22D 19/04* (2013.01); *B22D 19/00* (2013.01)
USPC ............................................ 74/492; 280/775

(58) Field of Classification Search
CPC ............ B62D 1/16; B62D 1/18; B62D 1/184; B62D 1/185; B22D 19/00; B22D 19/04
USPC ................... 403/109.1, 359.1, 359.4, 359.5; 280/775, 777; 74/492, 493; 29/458, 29/460, 527.2, 527.3, 527.5, 527.6, 894.1; 464/182
See application file for complete search history.

(56) References Cited

U.S. PATENT DOCUMENTS 72,409 A * 12/1867 Mason ........................ 403/359.1
1,995,419 A * 3/1935 Derrom ........................ 29/527.5
(Continued)

FOREIGN PATENT DOCUMENTS

JP  1994-008150  1/1994
JP  2003-072517  3/2003
(Continued)

OTHER PUBLICATIONS

Japanese Application Notification of Reasons for Refusal dated Dec. 10, 2013 issued in the corresponding Japanese Patent Application.

*Primary Examiner* — Paul N Dickson
*Assistant Examiner* — Robert A Coker
(74) *Attorney, Agent, or Firm* — Hartman Global IP Law; Gary M. Hartman; Michael D. Winter

(57) ABSTRACT

Construction is achieved that is capable of maintaining overall strength of a cylindrical-shaped steering column, while at the same time making it possible to make the thickness part of the steering column thin. An outer column 10b, which is a column member of a steering column is formed by connecting in the axial direction a main portion 18 made using a light metal alloy with a cylindrical member 19 made of an iron-based alloy by a concave groove 20 that is formed around the outer circumferential surface of the front end section of the cylindrical member 19 engaging with a protrusion 21 that is formed around the inner circumferential surface of the rear end section of the main portion 18. A ring 22 made using a metallic material is fitted and fastened inside the inner diameter side of the cylindrical member 19 in the connecting section between the main portion 18 and the cylindrical member 19.

2 Claims, 22 Drawing Sheets

(56) References Cited

U.S. PATENT DOCUMENTS

| | | | |
|---|---|---|---|
| 4,991,871 A * | 2/1991 | Sadakata | 280/777 |
| 5,235,734 A * | 8/1993 | DuRocher et al. | 29/455.1 |
| 5,243,874 A * | 9/1993 | Wolfe et al. | 74/493 |
| 5,507,203 A * | 4/1996 | Audibert et al. | 74/492 |
| 5,590,565 A * | 1/1997 | Palfenier et al. | 74/493 |
| 5,623,756 A * | 4/1997 | Yanagidate et al. | 29/525 |
| 5,718,131 A * | 2/1998 | Bobbitt, III | 70/184 |
| 5,722,300 A * | 3/1998 | Burkhard et al. | 74/493 |
| 5,813,794 A * | 9/1998 | Castellon | 403/359.5 |
| 6,530,599 B1 * | 3/2003 | Oka | 280/777 |
| 6,733,039 B2 * | 5/2004 | Honda et al. | 280/780 |
| 7,066,491 B2 * | 6/2006 | Kittler et al. | 280/777 |
| 7,726,691 B2 * | 6/2010 | Yamada | 280/775 |
| 8,549,953 B2 * | 10/2013 | Schnitzer | 74/493 |
| 2008/0252056 A1 | 10/2008 | Moriyama et al. | |
| 2009/0249916 A1 * | 10/2009 | Ridgway et al. | 74/492 |
| 2013/0055845 A1 * | 3/2013 | Rombold | 74/493 |

FOREIGN PATENT DOCUMENTS

| | | | |
|---|---|---|---|
| JP | 2007-153088 | | 6/2007 |
| JP | 2007153088 A | * | 6/2007 |
| JP | 20070153088 | | 6/2007 |
| JP | 2008265646 | | 11/2008 |
| JP | 2011-073547 | | 4/2011 |
| JP | 48-33566 | | 12/2011 |

* cited by examiner (A)

(B)

(C)

(A)

(B)

(A)

(B)

(A)

(B)

(C)

(A)

(B)

(C)

MANUFACTURING METHOD FOR A STEERING COLUMN, AND STEERING APPARATUS THAT USES THAT STEERING COLUMN

TECHNICAL FIELD

The present invention relates to a steering apparatus for an automobile, and particularly to a steering column of that steering apparatus and a manufacturing method thereof.

BACKGROUND ART

As a steering apparatus for applying a steering angle to steered wheel (normally, front wheels except in the case of special vehicles such as a forklift), construction as illustrated in FIG. 28 is well known. In this steering apparatus, a steering shaft 3 is supported on the inner-diameter side of a cylindrical steering column 2 that is supported by the vehicle 1 so as to be able to rotate. A steering wheel 4 is fastened to the rear end section of the steering shaft that protrudes further toward the rear than the opening on the rear end of the steering column 2. As the steering wheel 4 is rotated, this rotation is transmitted to an input shaft 8 of a steering gear unit 7 by way of the steering shaft 3, a universal joint 5a, an intermediate shaft 6 and a universal joint 5b. As the input shaft 8 rotates, a pair of tie rods 9 that are located on both sides of the steering gear unit 7 are pushed and pulled, and a steering angel is applied to the pair of left and right steered wheels according to the amount that the steering wheel 4 is operated.

In the construction illustrated in FIG. 28, in order to make it possible to adjust the forward-backward position of the steering wheel 4, a steering column 2 and a steering shaft 3 that can be extended and contracted are used. Moreover, the steering column 2 and steering shaft 3 comprise a mechanism for making it possible to protect the driver when the body of the driver collides with the steering wheel 4 during a secondary collision that occurs during a collision accident after a primary collision in which the automobile collides with another automobile, by absorbing the impact energy during this secondary collision and allowing the steering wheel 4 to displace in the forward direction. More specifically, construction is employed wherein the steering shaft 3 that supports the steering wheel 4 is supported by the vehicle body 1 so as to be able to displace in the forward direction due to an impact load in the forward direction during a secondary collision. In the construction illustrated in FIG. 28, the steering shaft 3 is composed of an outer tube 11 and an inner shaft, and together with the outer tube 11 being able to displace in the forward direction while the entire length of the steering shaft 3 contracts due to an impact load during a secondary collision, the steering column 2 that supports the steering shaft 3 is composed of an outer column 10 and an inner column, and this outer column 10 is supported by the vehicle body 1 so as to be able to displace in the forward direction while the entire length of the steering column 2 contracts. The forward-backward position of the outer column and inner column of this extending and contracting type of steering column, and the outer tube and inner shaft of this steering shaft can also be opposite that of the construction illustrated in the figure.

On the other hand, as measures against theft of the automobile, an automobile may comprise various kinds of anti-theft apparatuses. As one of the anti-theft apparatus, a steering lock apparatus that makes it impossible to operate the steering wheel except when a proper key is used is in widespread use. FIG. 29 illustrates an example of construction of a steering lock apparatus that is disclosed in JP 2008-265646 (A). The steering apparatus 12 is provided with a lock unit 13 in part of the steering column 2a, and a key-lock collar 15, in which an engaging concave section 14 is formed in at least one location in the circumferential direction, is fitted around and fastened to a position on part of the steering shaft 3a, the phase in the axial direction of which coincides with that of the lock unit 13. During operation (when the key is locked), the tip end section of a lock pin 16 of the lock unit 13 is caused to displace in a direction toward the inner-diameter side of the steering column 2a through a lock through hole 17 that is formed in the middle section in the axial direction of the steering column 2a, and by engaging with the engaging concave section 14, makes it substantially impossible for the steering shaft to rotate.

When this kind of steering lock apparatus 12 is assembled in a steering apparatus, the lock unit 13 is provided on the outer-diameter side of the steering column 2a, and the key-lock collar 15 is provided on the inner-diameter side of the steering column 2a. Therefore, in order to locate the key-lock collar 15 on the inner-diameter side of the steering column 2a so as to be able to rotate, and in order to make it possible for the lock pin 16 and the key-lock collar 12 to engage or disengage without an excessive stroke of the lock pin 16, it is necessary to make at least the outer diameter of the portion of the steering column 2a where the steering lock apparatus is assembled small, and to make the inner diameter large, and to make the thickness of this portion of the steering column 2a thin.

FIG. 30 illustrates an outer column 10a of a steering column that is disclosed in JP 2007-223383 (A). The other end section of the cylindrical inner column is fitted inside one end section (left end section in FIG. 30) in the axial direction of the outer column so that relative displacement in the axial direction is possible. The outer column 10a is made of a light alloy such as an aluminum alloy, or magnesium alloy, and is integrally formed by casting, and a lock through hole 17a for assembling a steering lock apparatus 12 such as illustrated in FIG. 29 is provided in the middle section in the axial direction thereof. When the thickness of this kind of outer column 10a is thin, there is a possibility that the strength of the outer column 10a that is necessary when the steering lock apparatus 12 is operated may not be sufficiently maintained. In other words, when the lock pin 16 that protrudes through the lock through hole 17a toward the inner-diameter side of the outer column 10 is engaged with the engaging concave section 14 (see FIG. 29) of the key-lock collar 15, and an attempt is made to rotate the steering wheel 4 (see FIG. 28) with a large force, an excessively large force is applied to the perimeter edge section of the lock through hole 17a, and there is a possibility that this perimeter edge section may deform. It is feasible to form the outer column 10a using an iron alloy, however, a problem occurs in that the overall weight of the steering column increases.

SUMMARY OF THE INVENTION

Taking the situation above into consideration, the object of the present invention is to achieve construction wherein the thickness of part of the cylindrical steering column is thin, and the strength of the steering column can be maintained.

The steering column of the present invention has a cylindrical shape as a whole and is composed entirely or partly of a column member. This column member has: a main portion that is made using a light metal alloy such as an aluminum alloy or magnesium alloy, and comprises a convex section(s) provided at least at one location in the circumferential direction on a circumferential surface on one end; a cylindrical member that is made using an iron-based alloy, and comprises a concave section(s) at least at one location in the circumferential direction on a circumferential surface on one end that faces the circumferential surface of the main portion, and together with fitting with the main portion, is connected in the axial direction to the main portion by the engagement of the convex section(s) and concave section(s); and a ring that is made using a metal material, and is fitted and fastened on the inner diameter side of a connecting section between the main portion and the cylindrical member.

In one aspect of the invention, the convex section(s) is a protrusion that is formed around the circumference on the circumferential surface of the main portion, and the concave section(s) is a concave groove that is formed around the circumference on the circumferential surface of the cylindrical member.

In another aspect of the present invention, the convex section(s) is a protrusion that is formed so as to be long in the axial direction on the circumferential surface of the main portion, and the concave section(s) is a concave groove that is formed so as to be long in the axial direction on the circumferential surface of the cylindrical member. In this case, the concave groove is open on an end surface of the cylindrical member. Alternatively, the concave groove can be formed by performing knurling on an end section of the cylindrical member.

In the connection between the main portion and the cylindrical member, it is also possible to fit the cylindrical member into the main portion, and fit and fasten the ring inside the inner circumferential surface of the cylindrical member, or the inner circumferential surface of the cylindrical member and a portion of the main portion that is adjacent to the fitting section with the cylindrical member.

Alternatively, it is possible to fit the cylindrical member onto the main portion, and fit and fasten the ring inside the inner circumferential surface of the main portion and a portion of the cylindrical member that is adjacent to the fitting section with the main portion.

The steering column of the present invention can be suitably used in a steering apparatus that comprises a steering lock apparatus, and in that case a lock through hole of a steering lock apparatus is provided at one location in the middle section in the axial direction of the cylindrical member.

The manufacturing method of a steering column of the present invention is characterized by obtaining the column member by the following steps. In other words, the column member is obtained by: a step of fitting the ring inside the one end of the cylindrical member; a step of inserting the one end of the cylindrical member into an insertion through hole that is open on an end surface of a die to protrude the one end of this cylindrical member inside the die; a step of inserting an end section of a core cylinder into the ring; and a step of feeding molten light metal alloy into the die to form the main portion and causing part of the molten light metal alloy to enter into the concave section(s) to form the convex section(s) on the circumferential surface of the main portion. As long as there is no conflict, the order of these steps can be changed.

Preferably, with the main portion formed so that the inner diameter of the ring is smaller than the inner diameter of the main portion, and the inner diameter of the cylindrical member is larger than the inner diameter of the main portion that is separated in the axial direction from the connection section with the cylindrical member, and after the main portion has been formed, machining is performed on the inner diameter side of the ring so that the inner diameter of the ring is equal to or greater than the inner diameter of the portion of the main portion that is separated in the axial direction from the connecting section with the cylindrical member, and is equal to or less than the inner diameter of the cylindrical member.

The steering apparatus of the present invention comprises a steering column that is supported by a vehicle body; a steering shaft that is supported on the inner diameter side of the steering column so as to be able to rotate; and a steering lock apparatus that is provided between the steering column and the steering shaft and that essentially prevents the steering shaft from rotating inside the steering column when in operation; wherein the steering apparatus is particularly characterized by using the steering column of the present invention as the steering column.

With the steering column of the present invention, it is possible to maintain the strength of the steering column, while at the same time make the thickness of part of the steering column thin. In other words, one half section of the column member of this steering column is composed of a cylindrical member made using an iron-based alloy, so it is possible to maintain the strength of the one half section even though the thickness of this one half section thin. On the other hand, the other half section of the column member is composed of a main portion that is made using a light metal alloy such as an aluminum alloy or magnesium alloy, so the overall weight of the steering column is not increased excessively.

Moreover, through the engagement of the concave section(s) that is formed on a circumferential surface of the cylindrical member and the convex section(s) that is formed on a circumferential surface of the main portion, it is possible to improve the connecting strength in the axial direction and circumferential direction between the main portion and the cylindrical member. In other words, when the concave groove(s) that is formed around the entire circumference of a circumferential surface of the cylindrical member is engaged with the protrusion(s) that is formed around the entire circumference of a circumferential surface of the main portion, it is possible to maintain the connecting strength in the axial direction between the main portion and the cylindrical member. On the other hand, when a concave groove(s) formed so as to be long in the axial direction in one location or more in the circumferential direction of a circumferential surface of the cylindrical member engages with a protrusion(s) formed so as to be long in the axial direction in a portion(s) on a circumferential surface of the main portion that is aligned with the concave groove(s) in the circumferential direction, it is possible to maintain the connecting strength in the circumferential direction between the main portion and the cylindrical member.

In addition, when machining the inner diameter of the connecting section between the main portion and the cylindrical member, the cylindrical member having a thin thickness is not cut, so it is possible to prevent a decrease in strength of the cylindrical member. Furthermore, the steering column of the present invention does not have complex construction, so industrial production with good efficiency and low cost is possible.

MODES FOR CARRYING OUT THE INVENTION

Example 1

Figure 1:
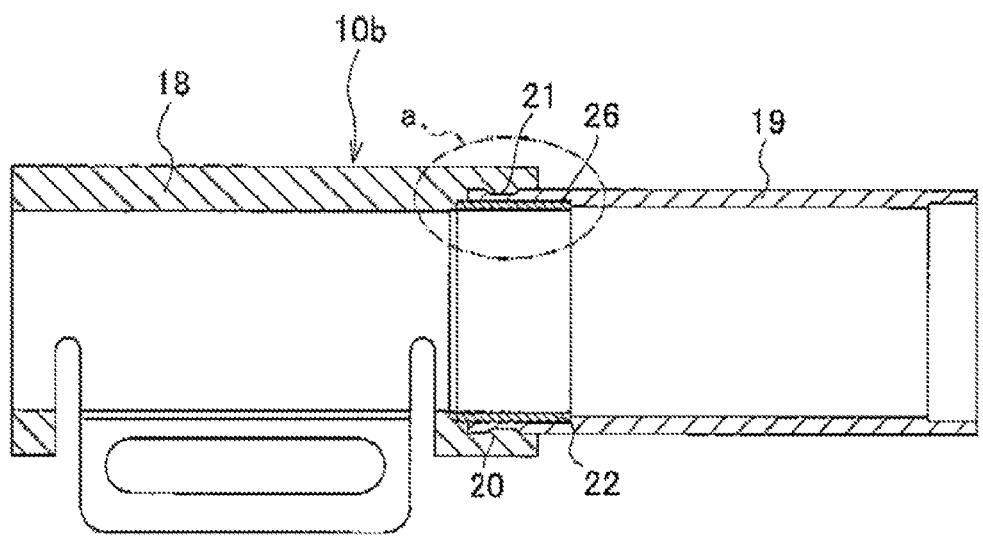
FIG. 1 illustrates a first example of an embodiment of the present invention, and is a cross-sectional view of a column member for a steering column.
Figure 2:
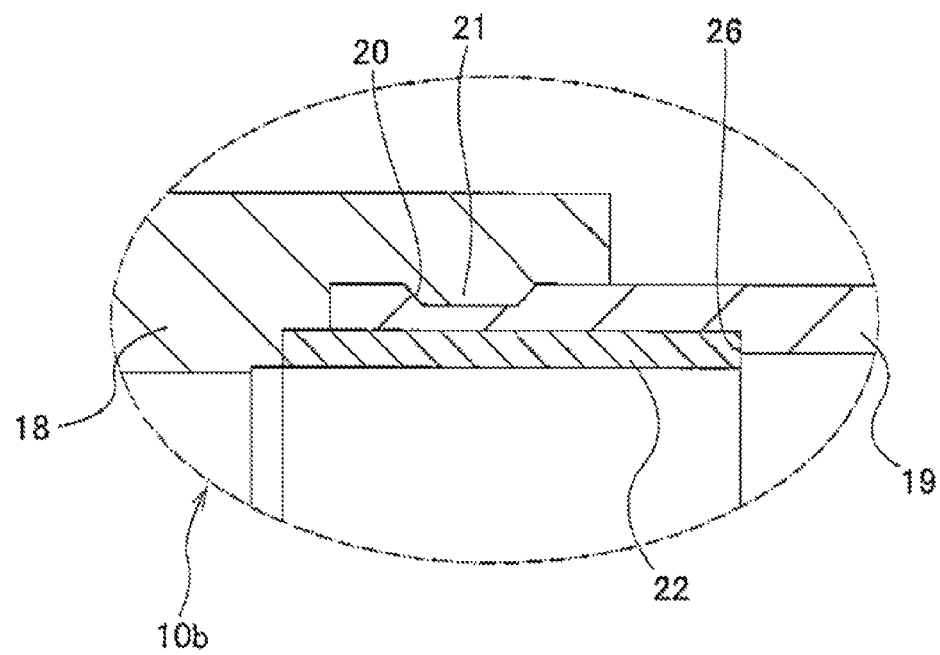
FIG. 2 is an enlarged view of part "a" in FIG. 1
Figure 3:
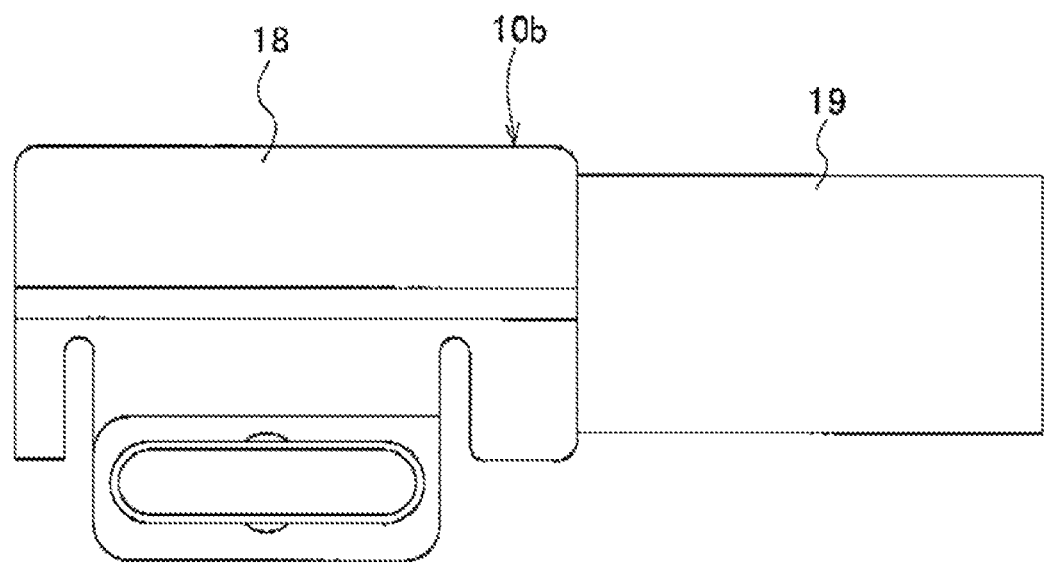
FIG. 3 is a side view of the column member of the first example of an embodiment of the present invention.
Figure 4:
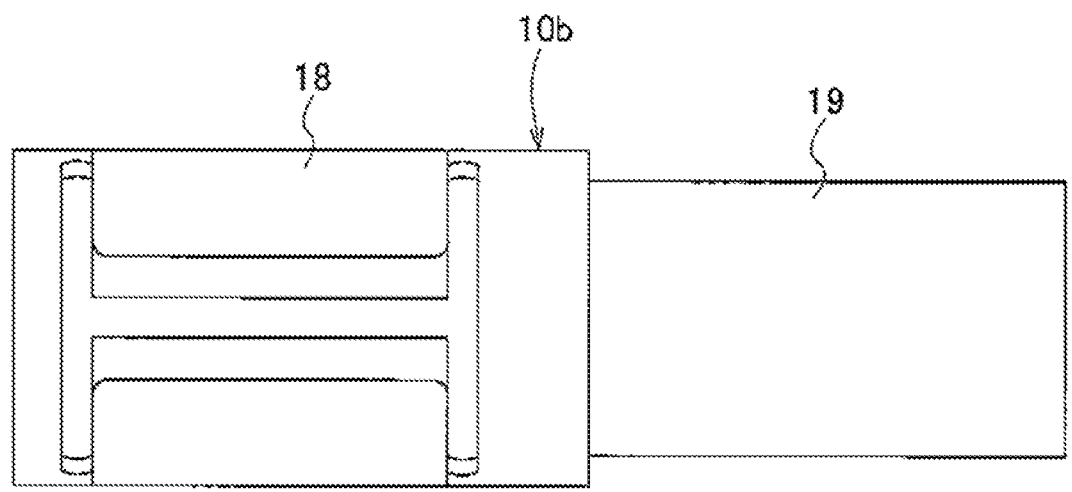
FIG. 4 is a view as seen from underneath in FIG. 3.
Figure 5:
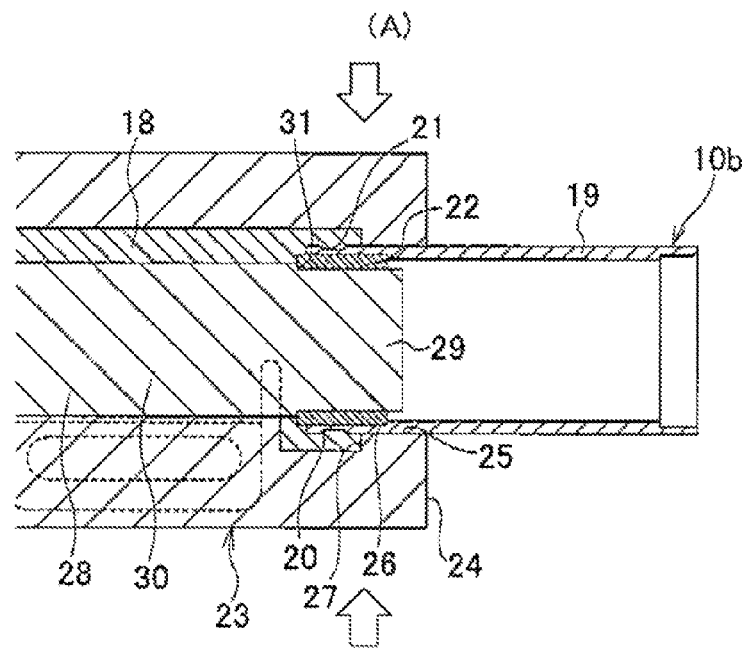
FIGS. 5A to 5C are partial cross-sectional views illustrating the processing steps of a manufacturing method for manufacturing a steering column of the first example of an embodiment of the present invention.
Figure 5:
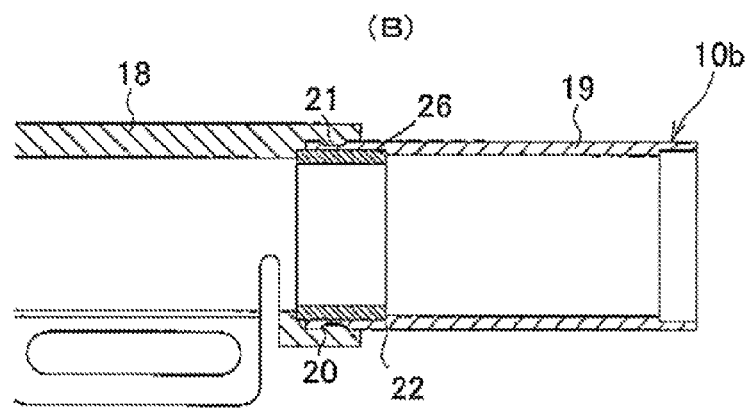
Figure 5:
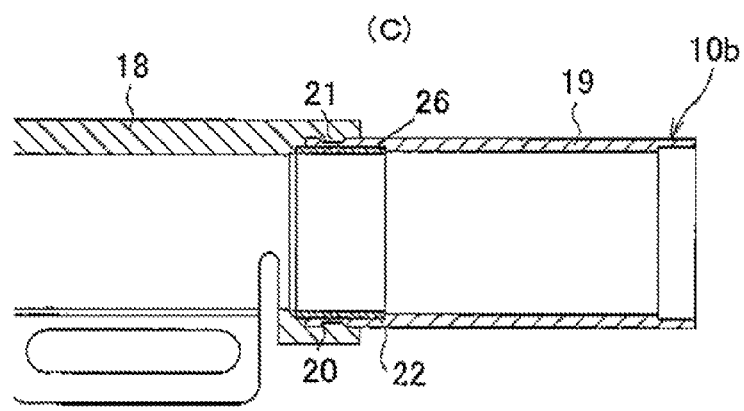

FIG. 1 to FIG. 5C illustrate a first example of an embodiment of the present invention. Including this example, a feature of the steering column of the present invention is industrially achieving construction that is capable of maintaining strength even when the thickness of the rear half section (right side in FIG. 1 to FIG. 5C) of the outer column 10$b$, which is a column member of the steering column, is thin. The construction and functions of the other parts are the same as in a conventional steering column, so drawings and explanations of identical parts will be omitted or simplified, with the explanation below centering on the features of this example.

In this example, the outer column 10$b$ is formed by connecting in the axial direction a main portion 18 that is made using a light metal ally such as an aluminum alloy or magnesium alloy, and a cylindrical member 19 that is made using an iron-based alloy such as carbon steel plate. In other words, the front end section (left side in FIGS. 1 to 5C) of the cylindrical member 19, which is one end thereof, is fitted and fastened into the rear end section (right side in FIG. 1 to FIG. 5C) of the main portion 18, which is one end thereof. The main portion 18 constitutes one half section (front half section) of the outer column 10$b$, and the cylindrical member 19 constitutes the other half section (rear half section) of the outer column 10$b$. The main portion 18 means a portion of the steering column or the outer column 10$b$ that is supported by and fastened to the vehicle body.

A concave groove 20 is provided in the circumferential direction around part in the axial direction of the outer circumferential surface of the front end section of the cylindrical member 19. The main portion 18 and the cylindrical member 19 are connected in the axial direction by engaging a protrusion 21 that is provided on the inner circumferential surface of the rear end section of the main portion 18.

A ring 22 having a cylindrical shape as a whole is fitted and fastened inside the inner circumferential surface of part in the axial direction of the front end section of the cylindrical member 19 and the rear end section of the main portion 18, which is the connecting section between the main portion 18 and the cylindrical member 19. As will be described later, by performing machining on the inner circumferential surface of the ring 22, the inner diameter of the ring 22 is made to be equal to or greater than the inner diameter of the portion of the main portion 18 that is separated in the axial direction from the connecting section with the cylindrical member 19, and is equal to or less than the inner diameter of the cylindrical member 19. The connecting section between the main portion 18 and the cylindrical member 19 means the portion of the rear end section of the main portion 18 that overlaps in the axial direction the cylindrical member 19 or the ring 22.

The material used for the ring 22 can be either a light metal alloy or an iron-based alloy, however preferably a light metal alloy such as an aluminum alloy or magnesium alloy is used. When the ring 22 is made using a light metal alloy, it is possible to reduce the cost and time required for machining inner circumferential surface of the ring 22 when compared with case of making the ring using a relatively hard metal material such as an iron-based alloy. Moreover, by making the main portion 18 and the ring 22 using the same light metal alloy, the cutting resistance can be made the same, so processing precision is improved.

In order to manufacture the steering column of this example, as illustrated in FIG. 5A, the front end section of the cylindrical member 19 is inserted and fitted inside an insertion hole that is open on the outside surface 24, which is one end surface, of the die 23, and the front end section of the cylindrical member 19 protrudes inside the die 23. The shape of the inner circumferential surface that defines the insertion hole 25 of this die 23 coincides with the external shape of the main portion 18 that is obtained by the manufacturing method of this example.

The ring 22 is fitted inside the front end section of the cylindrical member 19 with an interference fit beforehand. A stepped section 26 is provided on the inner circumferential surface of the middle section in the axial direction of the cylindrical member 19 and the inner diameter of the portion nearer the rear end than this stepped section 26 is smaller than the outer diameter of the ring 22 such that the ring 22 stops at the proper position without going all the way to the back side (right side in FIGS. 5A to 5C) when pressure fitting the ring 22 into the cylindrical member 19. Moreover, a stepped section 27 is provided on the inner circumferential surface of the die 23 and is located on the outside in the radial direction of the middle section in the axial direction of the ring 22.

A core cylinder 28 is inserted inside the insertion hole 25 of the die 23 from the other side (opposite side in the axial direction from the outside surface 24), and the tip end section 29, which is an end section on the one side, of the core cylinder 28 is inserted into and fastened inside the ring 22. When doing this, a stepped surface 31 that is provided between the tip end section 29 and base end section 30 of the core cylinder 28 presses the ring 22 toward the back side (stepped section 26) of the cylindrical member 19. Therefore, the internal space of the die 23 is defined by the die 23, the front end section of the cylindrical member 19, the ring 22 and the core cylinder 28.

In this state, a molten light metal alloy such as an aluminum alloy is fed into the die 23, and as illustrated by the arrows in FIG. 5A, pressure is applied to the die 23 from the top and bottom. This pressure seals the internal space inside the die, and it becomes possible to feed the molten metal into the internal space of the die 23 with sufficient pressure, and as a result, the main portion 18 is formed. At this time, by molten metal entering into the concave groove 20 of the cylindrical member 19, the protrusion 21 is formed on the inner circumferential surface of the main portion 18. Moreover, the stepped section 27 is located on the outside in the radial direction of the middle section of the ring 22, so the edge on the rear end (edge on the right end in FIGS. 5A to 5C) of the main portion 18 is formed on the outside in the radial direction of the middle section in the axial direction of the ring 22.

After the outer column 10b that was obtained by forming the main portion 18 is removed from the die 23, machining is performed on the inner diameter side of the ring 22 and a portion of the rear end section of the main portion 18 that adjoins the connecting section with the cylindrical member 19, and the inner diameter of the ring 22 and the portion of the rear end section of the main portion 18 that adjoins the connecting section with the cylindrical member 19 is made to be equal to or greater than the inner diameter of the portion of the main portion 18 that is separated in the axial direction from the connecting section with the cylindrical member 19, and equal to or less than the inner diameter of the cylindrical member 19. As long as the inner diameter of the main portion 18 in the portion that is separated in the axial direction from the connecting section is kept within a range so as to be equal to or less than the inner diameter of the ring 22, it is possible to perform machining on the inner diameter side of the portion of the main portion 18 that is separated from the connecting section with the cylindrical member 19. By performing this kind of machining, the inner circumferential surface through which the inner column is inserted can be made uniform, and thus it is possible to stabilize the connecting force between the inner column and the main portion 18.

Moreover, performing machining also on the inner diameter side of the portion of the rear end section of the main portion 18 that adjoins the connecting section with the cylindrical member 19 for convenience for simplifying processing, and the processing described above can be essentially evaluated as being performed on the inner diameter side of the ring 22.

In the case of the steering column of this example, it is possible to make the thickness of the rear half section of the outer column 10b of the steering column, into which a steering lock apparatus 12 (see FIG. 29) is assembled, thin, while at the same time maintaining the strength thereof. In other words, the rear half section of the outer column 10b is composed of the cylindrical member 19 made using an iron-based alloy for which it is easy to maintain strength. Therefore, it is possible to maintain the overall strength of the outer column 10b that includes the cylindrical member 19 even when in order to install a lock unit 13 or key-lock collar 15, the thickness of the cylindrical member 19 of this rear half section is made thin up to 0.4 to 0.75 times, or preferably, 0.5 to 0.7 times the thickness of the main portion 18, or a lock through hole 17 for inserting a locking pin 16 is formed. On the other hand, the portion of the steering column that includes the column members except for the cylindrical member 19 (main portion 18 of the outer column 10b and the inner column) is made using a light metal alloy such as an aluminum alloy or magnesium alloy, and the thickness of the cylindrical member 19 is thin, so there is not excessive increase in the overall weight of the steering column.

Moreover, the concave groove 20 that is formed around the outer circumferential surface of the cylindrical member 19 engages with the protrusion 21 that is formed around the inner circumferential surface of the main portion 18, so it is possible to maintain the connecting strength in the axial direction between the main portion 18 and the cylindrical member 19. By increasing the contact surface area between the main portion 18 and the cylindrical member 19 in the circumferential direction as well, it is possible to increase the sliding resistance, and improve the connecting strength in the circumferential direction. Furthermore, when necessary, by forming an uneven surface on the bottom surface of the concave groove 20, or forming a through hole that is open in the bottom surface of the concave groove 20 and blocked by the ring 22, it is possible to more surely prevent relative rotation between the main portion 18 and the cylindrical member 19.

Figure 6:
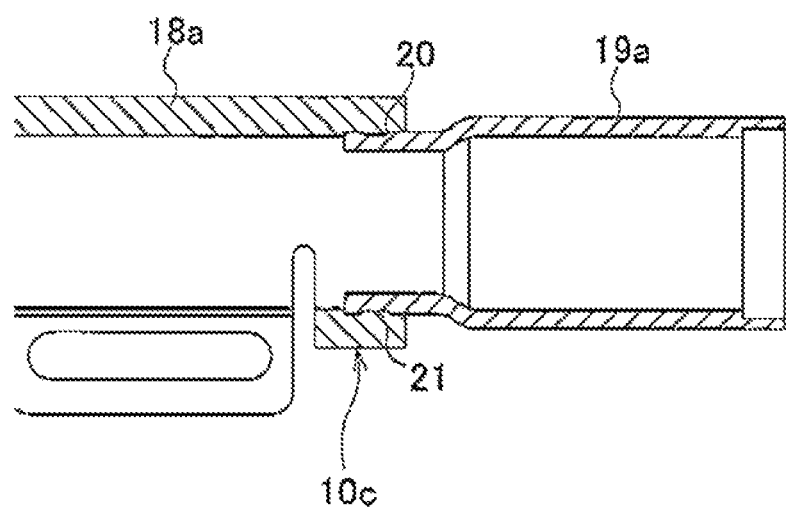
FIGS. 6A and 6B are cross-sectional view for explaining the problems with the manufacturing method when a ring is not used.
Figure 6:
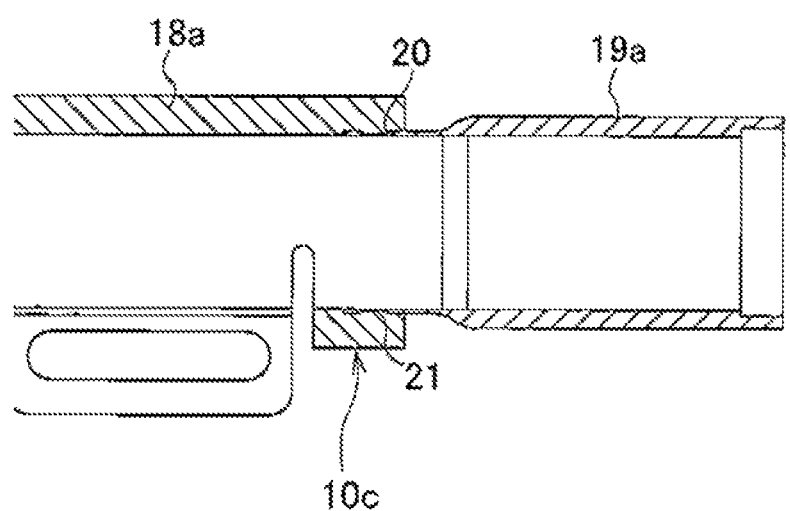

Furthermore, the ring 22 made of a metal material is fitted and fastened inside the connecting section between the main portion 18 and the cylindrical member 19, so it is possible to more effectively maintain the strength of this connecting section. The advantage of providing the ring 22 will be explained using FIGS. 5A to 5C and FIGS. 6A and 6B. FIGS. 6A and 6B illustrate a reference example of the case wherein the outer column 10c is constructed without using a ring 22 (see FIG. 1 to FIG. 5C), and the main portion 18a and cylindrical member 19a are connected in the axial direction based on only the engagement between the concave groove 20 and protrusion 21, and furthermore, the inner diameter of the cylindrical member 19a is equal to or greater than the inner diameter of the main portion 18a in the portion that is separated in the axial direction from the connecting section between the main portion 18a and the cylindrical member 19a. As was explained using FIGS. 5A to 5C, when casting the main portion 18, 18a, in order to prevent molten metal from leaking out, an opposing surface was necessary for the stepped surface 31 of the core cylinder 28 to come in contact with. In the present invention, this opposing surface is the end surface of the ring 22, however, in the case of the reference example, this opposing surface is the end surface of the cylindrical member 19a.

In the reference example, under these conditions, the main portion 18a is formed by casting in the same way as in the case illustrated in FIG. 5A such that the inner circumferential surface of the rear end section of the main portion 18a engages with the outer circumferential surface of the front end section of the cylindrical member 19a. Next, as illustrated in FIG. 6B, machining is performed on the inner diameter side of the cylindrical member 19a in the connecting section between the main portion 18a and the cylindrical member 19a in order to make the inner diameter of the cylindrical member 19a equal to or greater than the inner diameter of the portion of the main portion 18a that is separated from the connecting section with the cylindrical member 19a. The thickness of the cylindrical member 19a is thin, so when machining is performed on the inner diameter side thereof, the thickness of the cylindrical member 19a in the connecting section become excessively thin, and it is not possible to maintain the connecting strength of this connecting section. On the other hand, in the construction of this example, when performing machining on the inner diameter side of the connecting section, what is machined is essentially the inner diameter side of the ring 22, and the cylindrical member 19 is not cut. The total thickness of the overlapping front end section of the cylindrical member 19 and the ring 22 illustrated in FIG. 5A and FIG. 5B is sufficiently larger than the thickness of the front end section of the cylindrical member 19a illustrated in FIG. 6A. Therefore, as illustrated in FIG. 5C, even when the ring 22 is machined, it is possible to sufficiently maintain the thickness of the overlapping section, so the strength of the connecting section between the main portion 18 and the cylindrical member 19 is sufficiently maintained.

Furthermore, machining is performed on the inner diameter side of the ring 22, and the inner diameter of the ring 22 is made to be equal to or greater than the inner diameter of the portion of the main portion 18 that is separated in the axial direction from the connecting section with the cylindrical member 19, and equal to or less than the inner diameter of the cylindrical member 19. A cylindrical shaped inner column (not illustrated in the figures) is fitted inside the front end section (left end section in FIG. 1) of this kind of outer column 10b to form an extending and contracting steering column. The inner diameter of the outer column 10b becomes larger from the front side (left side in FIG. 1) in the order of the main portion 18, the ring 22 and the cylindrical member 19, so when the outer column 10b displaces toward the front in the axial direction with respect to the inner column when adjusting the forward-backward position of the steering wheel or during a secondary collision, the rear end edge of the inner column does not interfere with the portion that protrudes from the inner circumferential surface of the outer column 10b, so it is possible to prevent damage due to forward displacement of the steering wheel.

The ring 22 fits inside the front end section of the cylindrical member 19, so when forming the main portion 18 by feeding molten light metal alloy into the die 23, the molten metal does not enter into the inner circumferential surface side of the cylindrical member 19, so it is possible to prevent the inner circumferential surface of the cylindrical member 19 from becoming a rough surface due to light metal alloy adhering to the surface. Moreover, the stepped section 27 on the inner circumferential surface of the die 23 is located on the outside in the radial direction of the ring 22, so as molten metal is fed into the die 23, and pressure is applied from the top and bottom as illustrated by the arrows in FIG. 5A, the pressurized molten metal is fed inside the cavity of the die 23, and the pressure that is applied to the outer circumferential surface of the front end section of the cylindrical member 19 is supported by the ring 22. Therefore, it is possible to prevent the cylindrical member 19 from deforming inward in the radial direction due to the pressure. In other words, when the stepped section 27 on the inner circumferential surface of the die 23 is located on the outside in the radial direction of the cylindrical member 19 at a position separated in the axial direction from the ring 22, pressure is applied inward in the radial direction to the outer circumferential surface of the middle section in the axial direction of the cylindrical member 19 by the pressurized molten metal, and there is a possibility that the middle section in the axial direction of the cylindrical member 19 (portion separated in the axial direction from where the ring 22 is fitted inside) will deform, however, with the construction of this example, it is possible to prevent this kind of deformation.

Example 2

Figure 7:
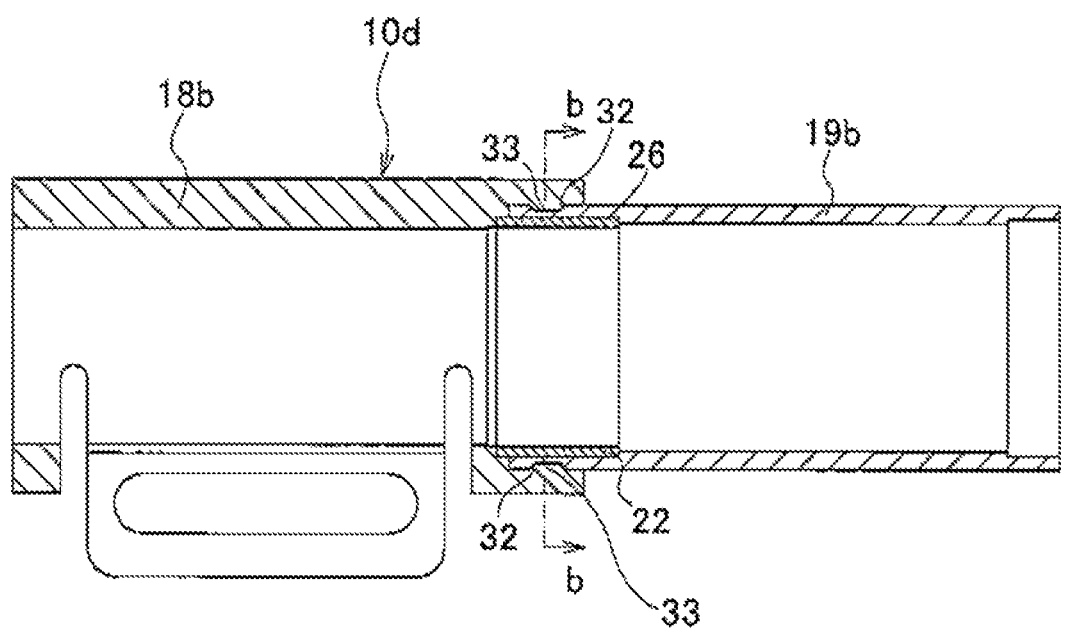
FIG. 7A is a drawing similar to FIG. 1, and illustrates a second example of an embodiment of the present invention.
FIG. 7B is a cross-sectional view of section "b-b" in FIG. 7A.
Figure 7:
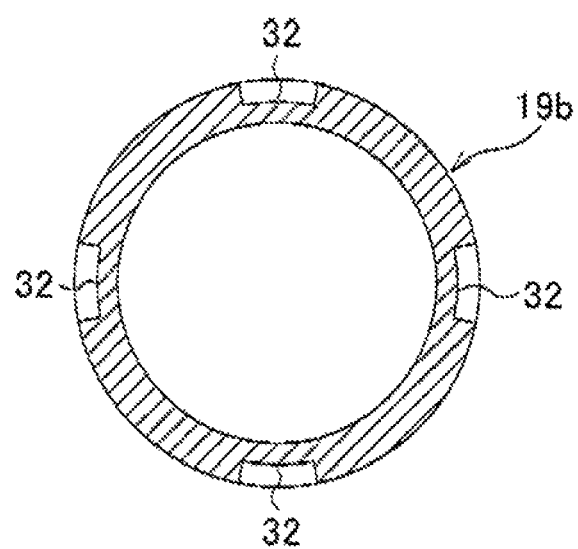
Figure 8:
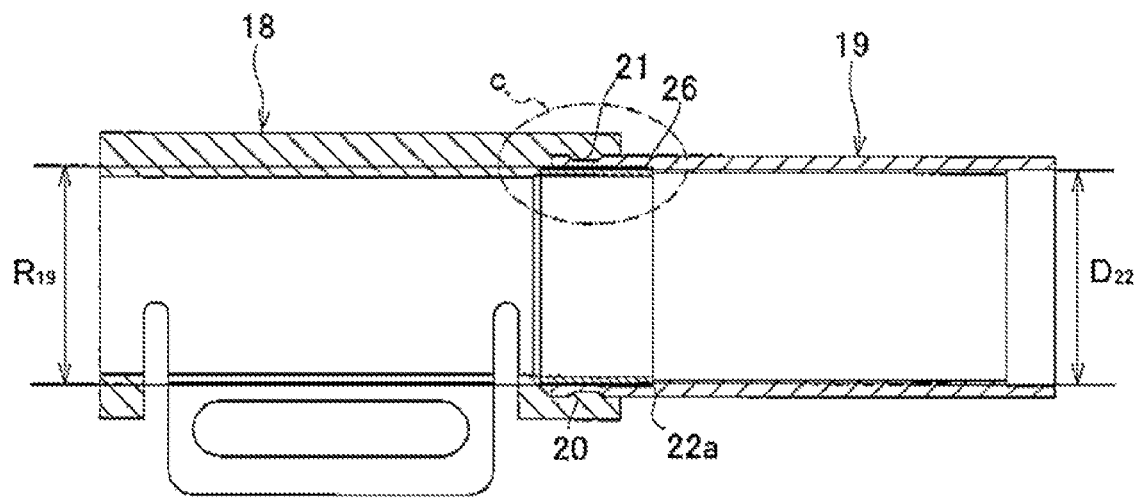
FIG. 8 is a drawing similar to FIG. 1, and illustrates a third example of an embodiment of the present invention.
Figure 9:
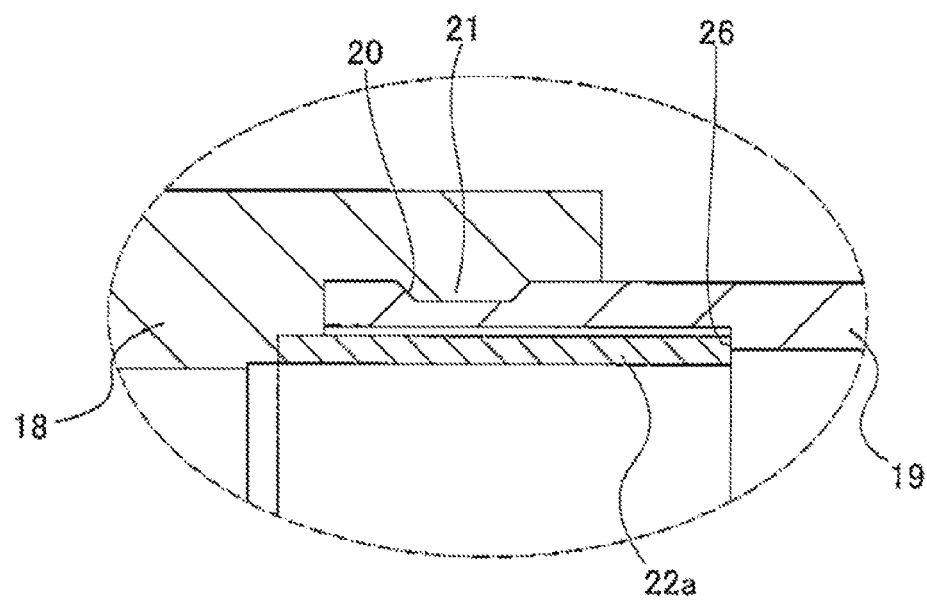
FIG. 9 is an enlarged view of part "c" in FIG. 8.
Figure 10:
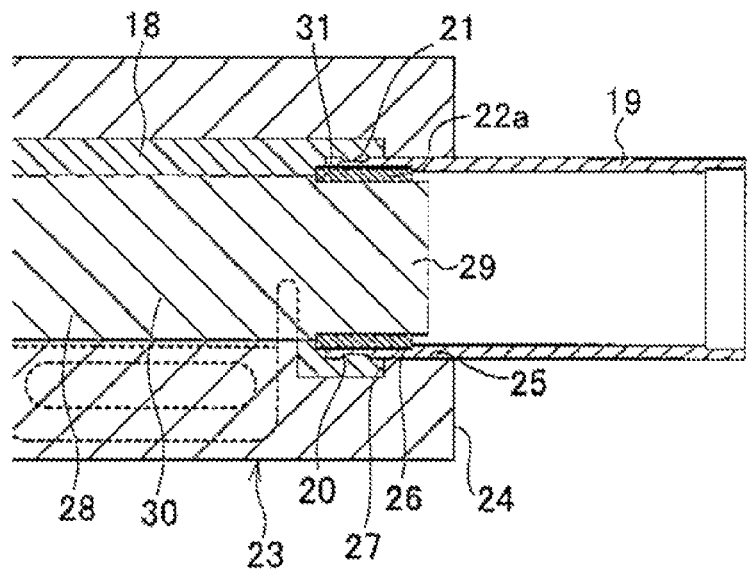
FIGS. 10A to 10C are drawings similar to FIGS. 5A to 5C, and illustrate the processing steps of a manufacturing method for a steering column of the third example of an embodiment of the present invention.
Figure 10:
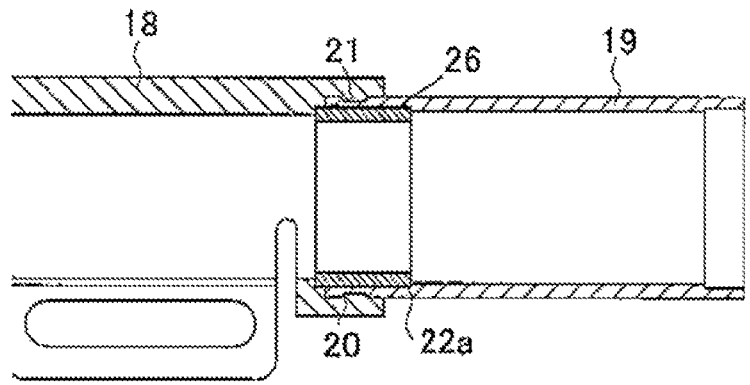
Figure 10:
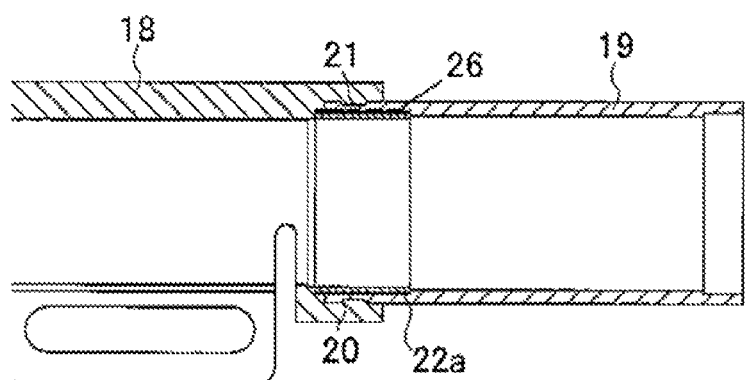

FIGS. 7A and 7B illustrate a second example of an embodiment of the present invention. In this example, concave grooves 32 are provided a one or a plurality of locations (four locations in the example in the figures) in the circumferential direction on the outer circumferential surface of the front end section of the cylindrical member 19b of the outer column 10d. Convex sections 33 are provided on the inner circumferential surface of the rear end section of the main portion 18b at positions that are aligned with the concave sections 32, and by the concave sections 32 and the convex sections 33 engaging, the connecting strength in the axial direction and the circumferential direction between the main portion 18b and the cylindrical member 19b is maintained. The construction and functions of the other parts of this second example are the same as in the first example of the embodiment.

Example 3

FIG. 8 to FIG. 10C illustrate a third example of an embodiment of the present invention. In this example, a ring 22a is fitted inside the inner circumferential surface of the cylindrical member 19 in the connecting section between the main portion 18 and the cylindrical member 19 with a loose fit. The outer diameter $D_{22}$ of the ring 22, as exaggeratedly illustrated in FIG. 8 to FIG. 10C, is a little smaller than the inner diameter $R_{19}$ of the front end section of the cylindrical member 19 ($D_{22} > R_{19}$), and a cylindrical minute gap is formed between the outer circumferential surface of the ring 22a and the inner circumferential surface of the cylindrical member 19. The thickness dimension "$(R_{19}-D_{22})/2$" in the radial direction of this minute gap is a small as possible and still be able to allow the ring 22a to be inserted in the front end section of the cylindrical member 19 with a loose fit without the need of pressure fitting, so that molten metal does not enter in this small gap, or in that case that the metal does enter, stops at a small amount.

In this example, a minute gap is formed between the outer circumferential surface of the ring 22a and the inner circumferential surface of the front end section of the cylindrical member 19, so the ring 22a can be inserted into the front end section of the cylindrical member 19 without pressure fitting, so it is possible to prevent a drop in work efficiency due to providing the ring 22a. Moreover, deformation of the ring 22a due to thermal expansion as the temperature rises can be absorbed by this minute gap. Therefore, even though the ring 22 thermally expands or contracts repeatedly, it is possible to prevent the occurrence of damage such as cracking in the ring 22a, or in the front end section of the cylindrical member 19 that exists around the ring 22a. The construction and functions of the other parts of this third example are the same as in the first example of the embodiment.

Example 4

Figure 11:
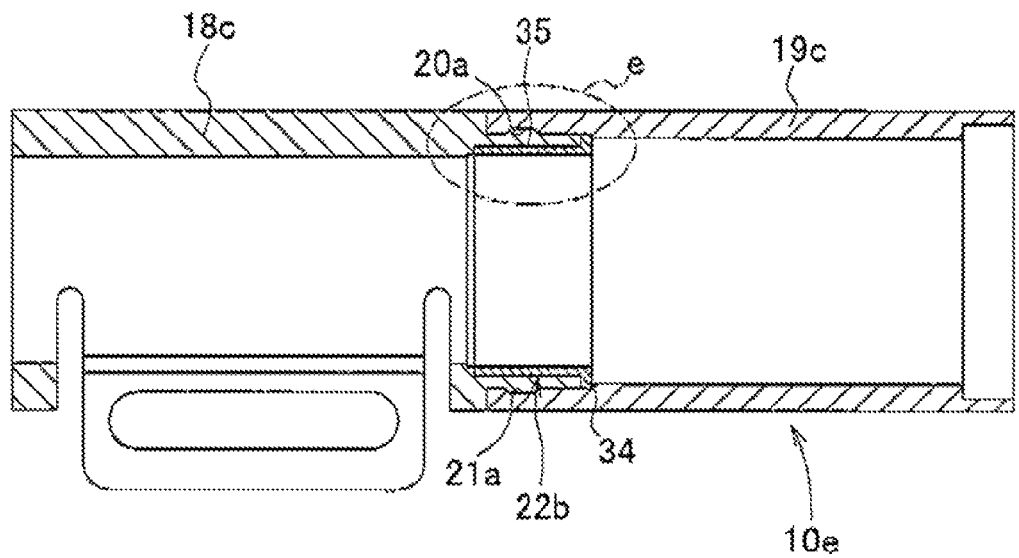
FIG. 11 is a drawing similar to FIG. 1, and illustrates a fourth example of an embodiment of the present invention.
Figure 12:
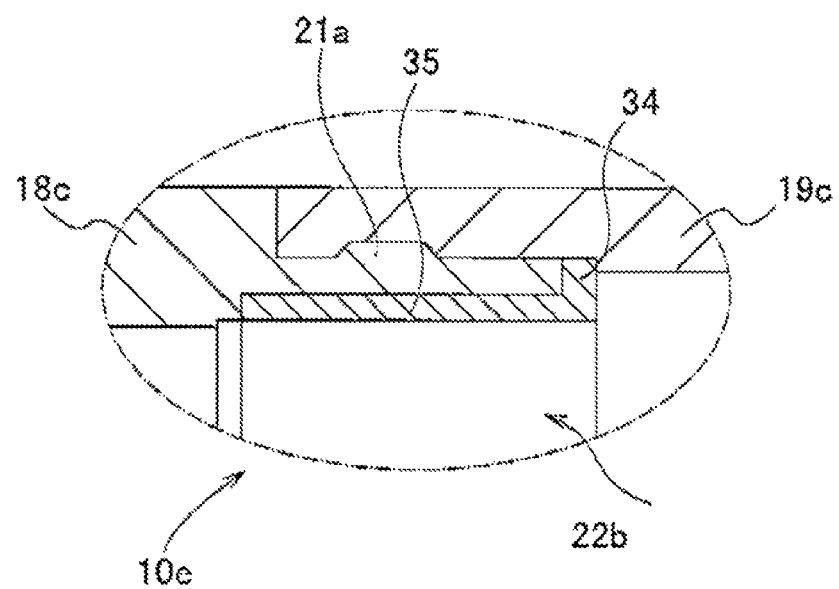
FIG. 12 is an enlarged view of part "d" in FIG. 11.
Figure 13:
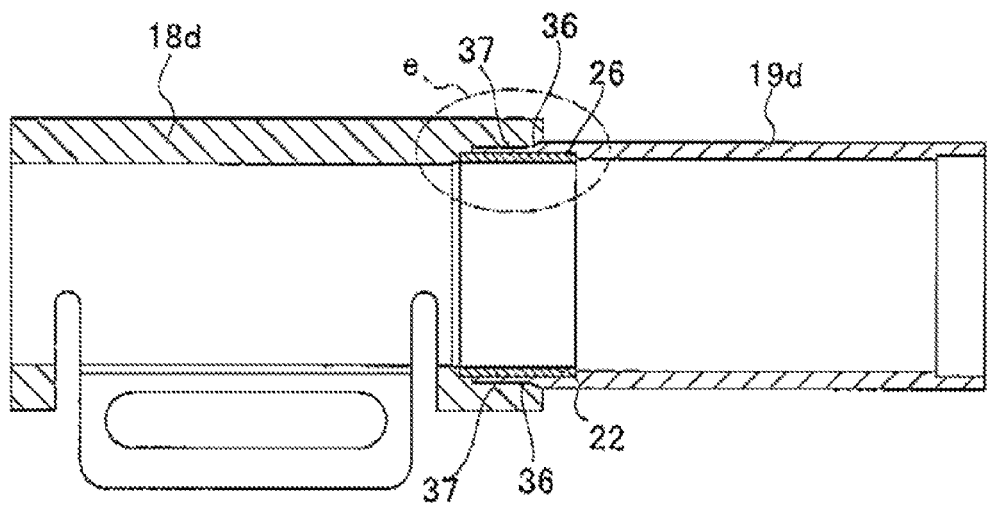
FIG. 13 illustrates a fifth example of an embodiment of the present invention, and is a cross-sectional view of a column member of a steering column.
Figure 14:
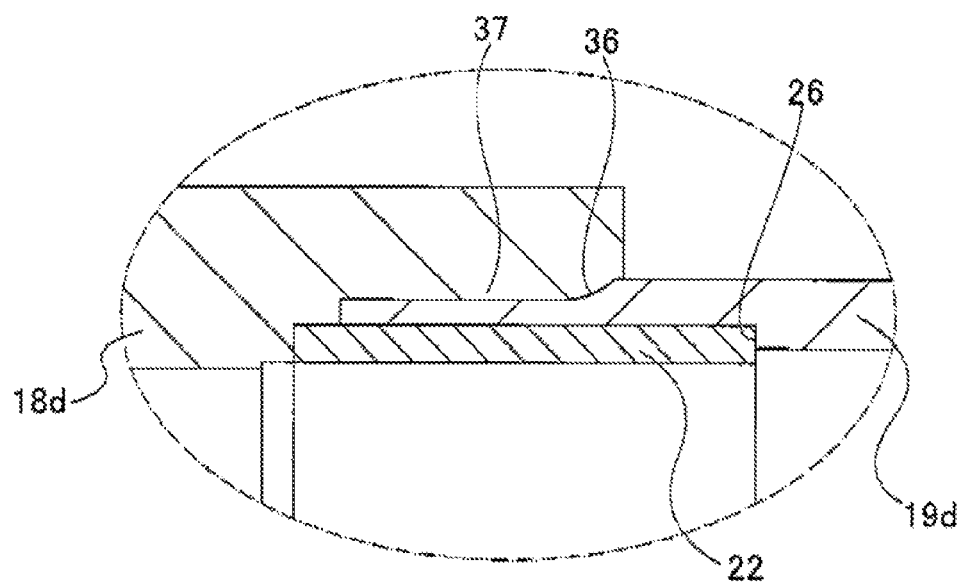
FIG. 14 is an enlarged view of part "e" in FIG. 13.
Figure 15:
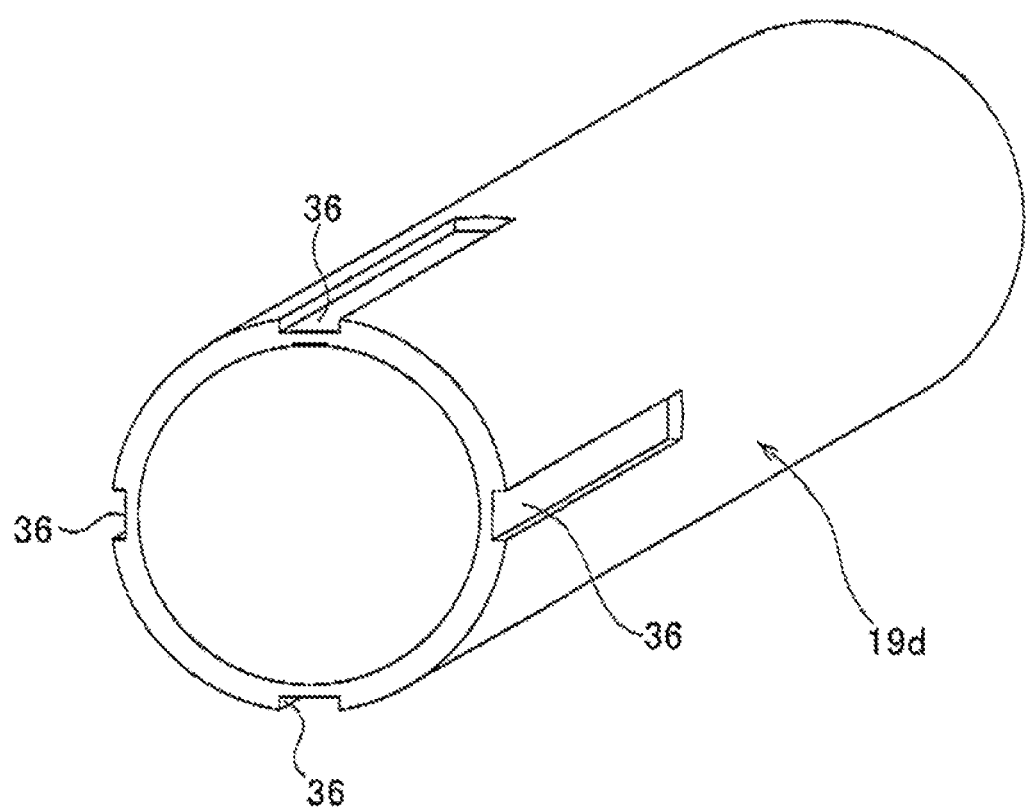
FIG. 15 is a perspective view of a cylindrical member that has been removed from the steering column of the fifth example of an embodiment of the present invention.
Figure 16:
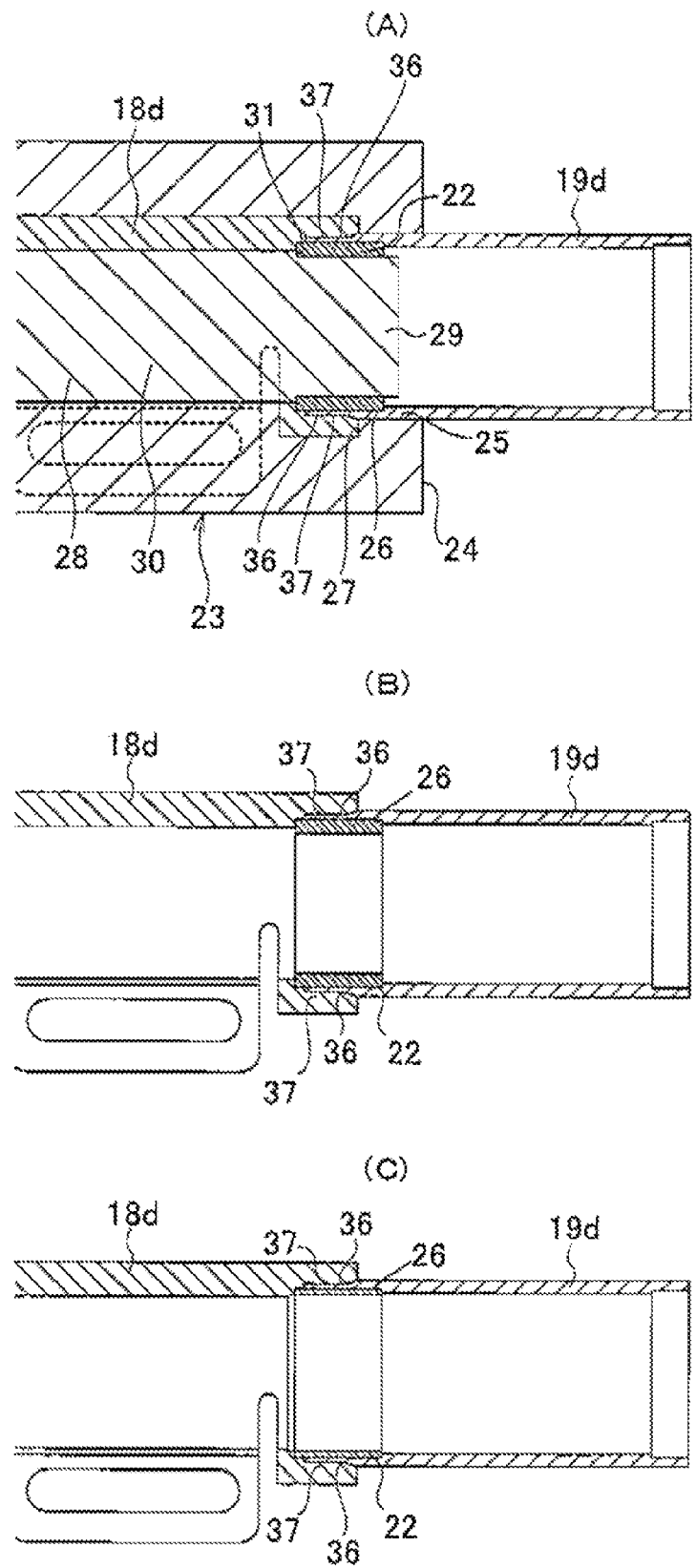
FIGS. 16A to 16C are drawings similar to FIGS. 5A to 5C, and illustrate the processing steps of a manufacturing method for a steering column of the fifth example of an embodiment of the present invention.

FIG. 11 and FIG. 12 illustrate a fourth example of an embodiment of the present invention. In this example, the outer column 10e is constructed such that the outer diameter of the main portion 18c is the same size as the outer diameter of the cylindrical member 19c, and the front end section of the cylindrical member 19c fits onto the rear end section of the main portion 18c. In order for this, a flange section 34 that protrudes outward in the radial direction is provided on the rear end section of the ring 22b, and the outer circumferential surface of the flange section 34 fits and fastens inside the inner diameter portion of the front end section of the cylindrical member 19c. The rear end section of the main portion 18c is held between a small-diameter section 35 that is provided from the middle section to the front end section of the ring 22b and the front end section of the cylindrical member 19c, and the main portion 18c and the cylindrical member 19c are connected in the axial direction to form the outer column 10e. Moreover, in this example, by the concave groove 20a that is formed around the inner circumferential surface of the front end section of the cylindrical member 19c engaging with the protrusion 21a that is formed on the rear end section of the main portion 18c, the connecting strength in the axial direction and the circumferential direction between the main portion 18c and the cylindrical member 19c is maintained. As a result, in this example, it is possible to make the inner diameter of the cylindrical member 19c greater than the inner diameter of the main portion 18c, so it becomes easy to be able to maintain a gap for providing a key-lock collar 13 (see FIG. 29) on the inner diameter side of the cylindrical member 19c. The construction and functions of the other parts of this fourth example are the same as in the first example of the embodiment.

Example 5

FIG. 13 to FIG. 16C illustrate a fifth example of an embodiment of the present invention. In this example, concave grooves 36 that are long in the axial direction and that are open on the front end surface (left end surface in FIG. 13 and FIG. 14) of the cylindrical member 19d are provided at one or a plurality of locations (four locations in the example in the figures) in the circumferential direction of the outer circumferential surface of the front end section of the cylindrical member 19d. With protrusions 37 that are formed on the inner circumferential surface of the rear end section of the main portion 18d engaged with these concave grooves 36, the main portion 18d and the cylindrical member 19d are connected in the axial direction.

The concave grooves 36 are open in the front end surface (left end surface in FIG. 13 and FIG. 14) of the cylindrical member 19d, so when forming the main portion 18d by feeding molten light metal alloy up to the back end section of the die 23, part of the molten metal is fed into the concave grooves 36, and it is possible to secure the engagement strength between the concave grooves 36 and the protrusions 37. Furthermore, in the axial direction as well, by increasing the contact surface area between the main portion 18d and the cylindrical member 19d, it is possible to increase the sliding resistance, and thus it is possible to improve the connecting strength in the axial direction. Moreover, when necessary, by forming an uneven surface in the axial direction on the bottom surface of the concave grooves 36, or by forming through holes that are open on the bottom surface of the concave grooves 36 and blocked by the ring 22, it is possible to more surely improve the connecting strength in the axial direction between the main portion 18d and the cylindrical member 19d. The construction and functions of the other parts of this fifth example are the same as in the first example of the embodiment.

Example 6

Figure 17:
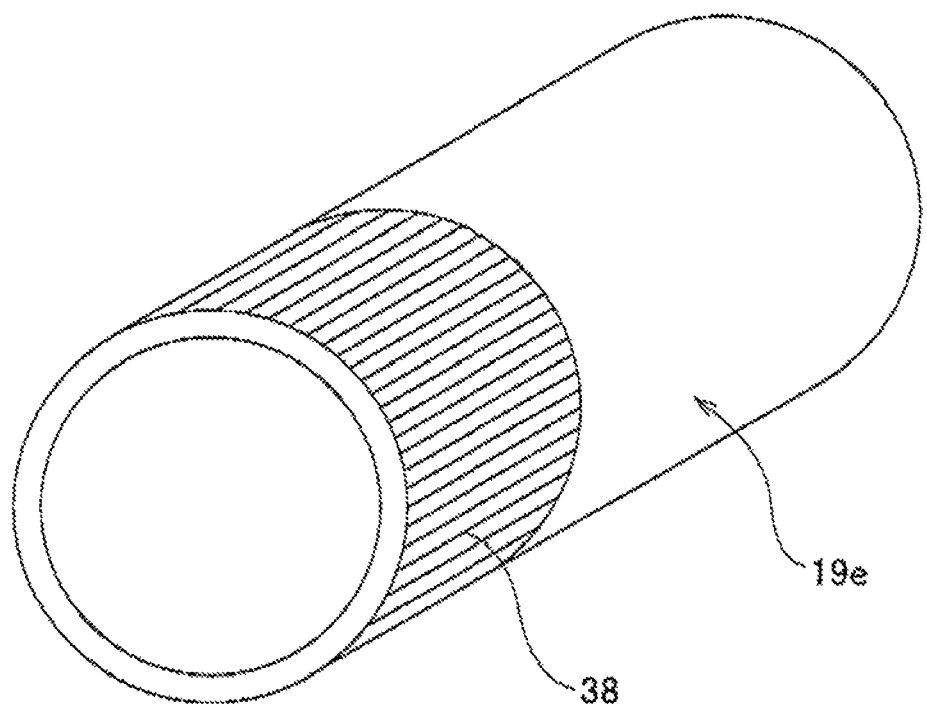
FIG. 17 is a drawing similar to FIG. 15, and illustrates a sixth example of an embodiment of the present invention.
Figure 18:
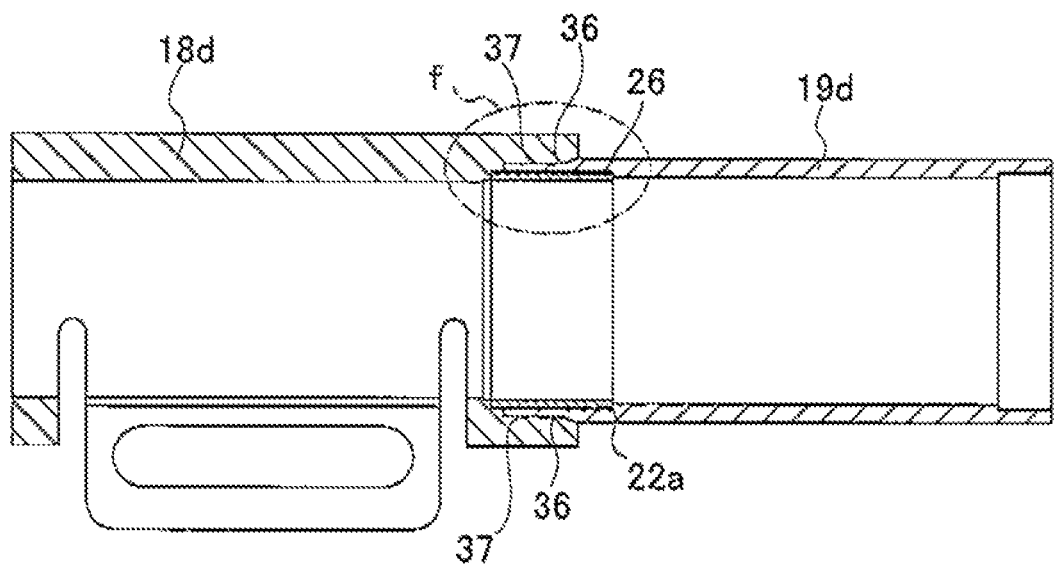
FIG. 18 is a drawing similar to FIG. 1, and illustrates a seventh example of an embodiment of the present invention.
Figure 19:
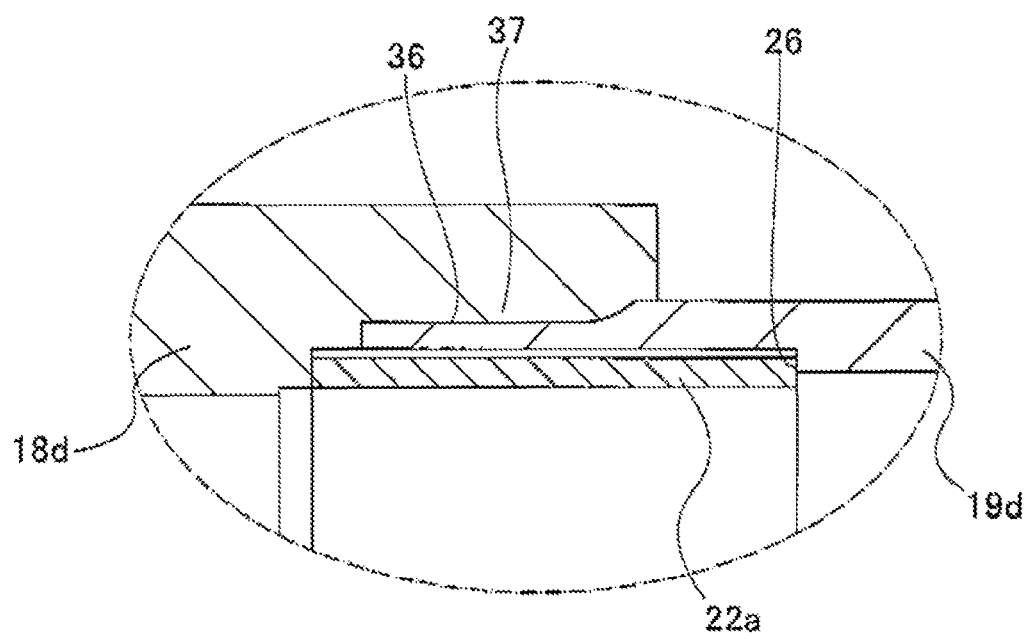
FIG. 19 is an enlarged view of part "f" in FIG. 18.
Figure 20:
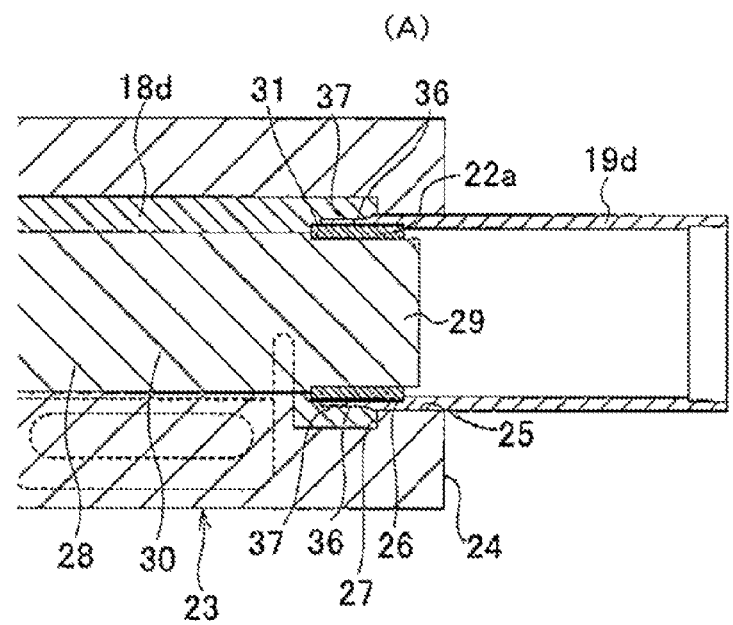
FIGS. 20A to 20C are drawings similar to FIGS. 5A to 5C, and illustrate the processing steps of a manufacturing method for a steering column of the seventh example of an embodiment of the present invention.
Figure 20:
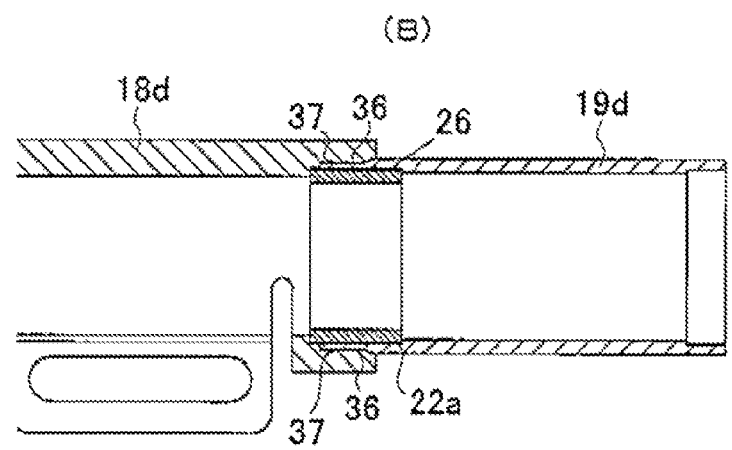
Figure 20:
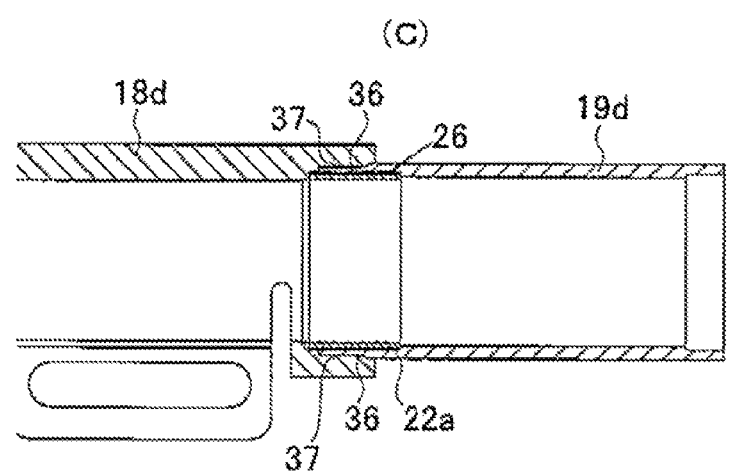
Figure 21:
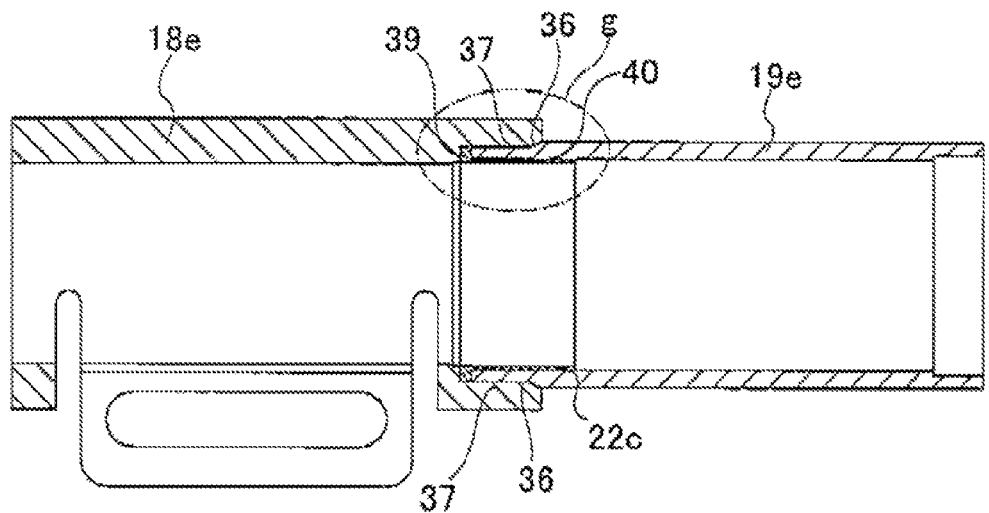
FIG. 21 is a drawing similar to FIG. 1, and illustrates an eighth example of an embodiment of the present invention.
Figure 22:
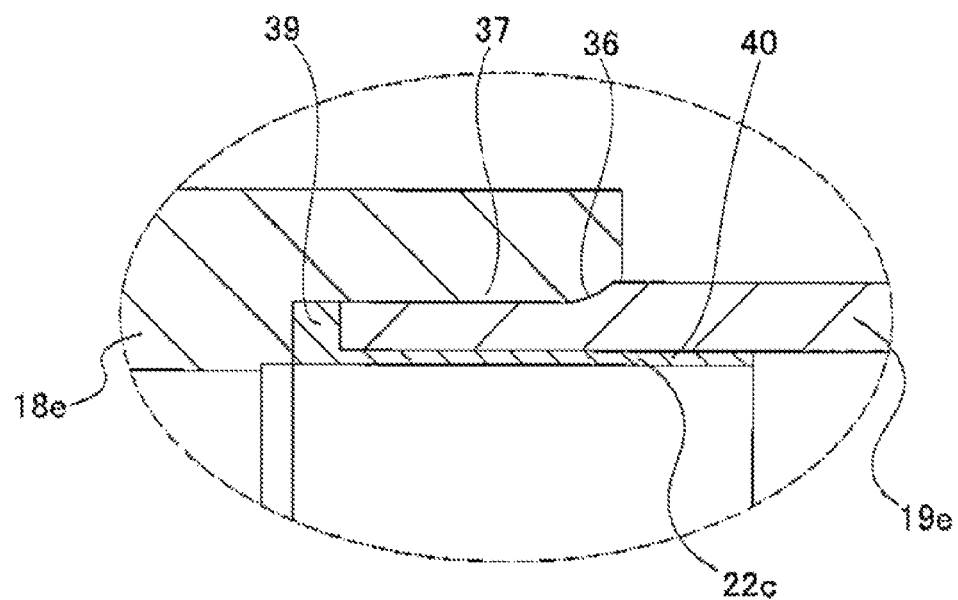
FIG. 22 is an enlarged view of part "g" in FIG. 21.
Figure 23:
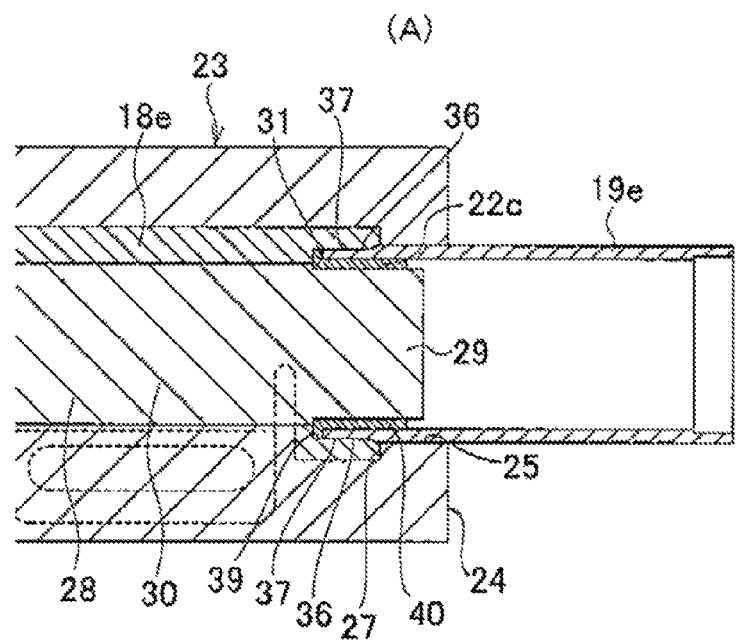
FIGS. 23A to 23C are drawings similar to FIGS. 5A to 5C, and illustrate the processing steps of a manufacturing method for a steering column of the eighth example of an embodiment of the present invention.
Figure 23:
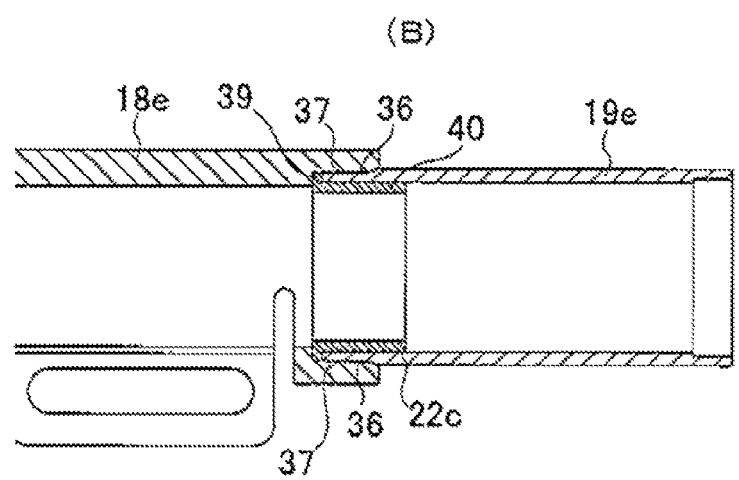
Figure 23:
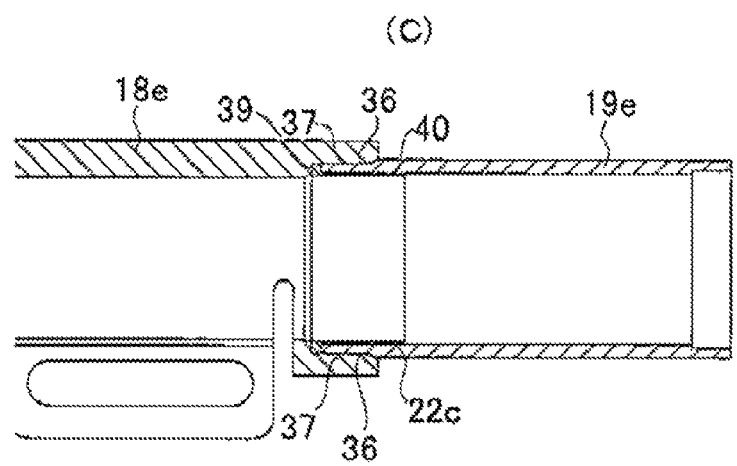

FIG. 17 illustrates a sixth example of an embodiment of the present invention. In this example, an uneven section 38 that is formed by forming a plurality of minute concave grooves by knurling on the outer circumferential surface on the tip end section of the cylindrical member 19e as illustrated by the plurality of straight lines in FIG. 17. When feeding molten light metal alloy into the die 23 (see FIGS. 5A to 5C) and forming the main portion, by feeding part of the molten metal into the uneven section 38, a plurality of minute protrusions are formed on the inner circumferential surface on the tip end section of the main portion. The uneven section 38 that is formed by knurling can be either straight knurls or twill knurls. In the case of forming twill knurls on the uneven section 38, it is possible to maintain the connecting strength in the axial direction in addition to the circumferential direction due to engagement between the minute concave sections and the minute protrusions. The construction and functions of the other parts of this sixth example are the same as in the first example of the embodiment.

Example 7

FIG. 18 to FIG. 20C illustrate a seventh example of an embodiment of the present invention. In this example, long concave groove 36 that is long in the axial direction is formed in the outer circumferential surface of the front end section of the cylindrical member 19d. When a protrusion 37 that is formed on the inner circumferential surface of the rear end section of the main portion 18d is engaged with the concave groove 36, the main portion 18d and the cylindrical member 19d are connected in the axial direction. Moreover, as is exaggeratedly illustrated in FIG. 18 to FIG. 20C, the outer diameter of the ring 22a is a little smaller than the inner diameter of the front end section of the cylindrical member 19d, and a minute gap is formed between the outer circumferential surface of the ring 22a and the inner circumferential surface of the front end section of the cylindrical member 19d. The construction and functions of the other parts of this seventh example are the same as in the third and fifth examples of the embodiment.

Example 8

FIG. 21 to FIG. 23C illustrate an eighth example of an embodiment of the present invention, in this example, a flange section 39 that protrudes outward in the radial direction is formed on the front end section (left end section in FIG. 21 to FIG. 23C). Before forming the main portion 18e by feeding molten metal into the die, a cylindrical section 40 that is formed from the middle section to the rear end section of the ring 22c is fitted and fastened inside the front end section of the cylindrical member 19e with an interference fit beforehand. When pressure fitting the cylindrical section 40 into the cylindrical member 19e, the rear end surface (surface on the right side in FIG. 21 to FIG. 23C) of the flange section 39 comes in contact with the front end surface of the cylindrical member 19e, so the ring 22e is prevented from going all the way to the back side (left side in FIG. 21 to FIG. 23C) of the cylindrical member 19e, and thus it is possible to stop the ring 22e at the proper position. Therefore, there is no need to provide a stepped section 26 as was done in the first example of the embodiment (see FIG. 1 to FIG. 2, and FIGS. 6A and 6B), and it is possible to prevent an increase in processing work and time. Moreover, because it is not necessary to provide a stepped section 26, the thickness of the front end section of the cylindrical member 19e does not become thin, so it is possible to better maintain the strength of the connecting section between the main portion 18e and the cylindrical section 19e. The construction and functions of the other parts of this eighth example are the same as in the fifth example of the embodiment.

Example 9

Figure 24:
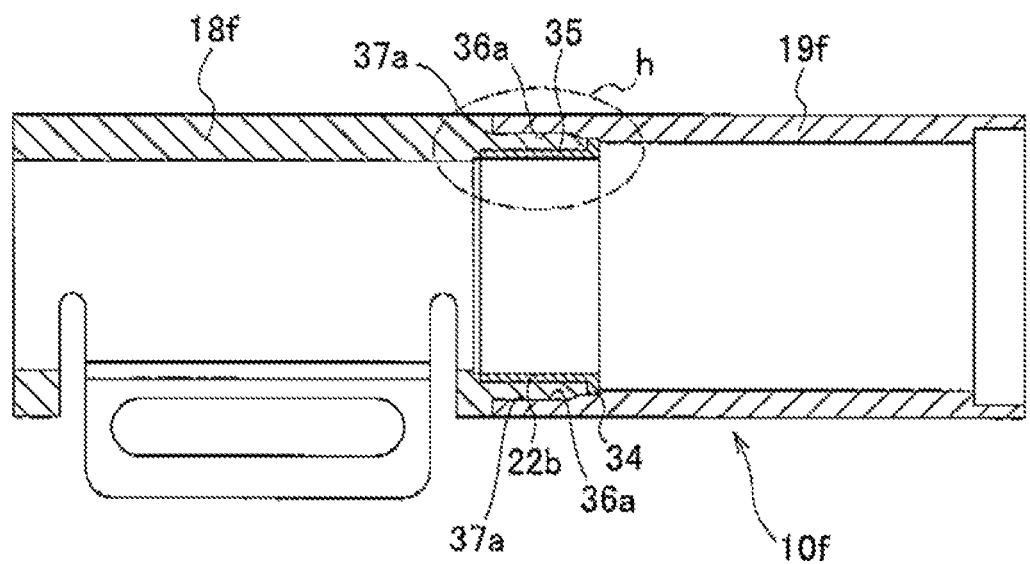
FIG. 24 is a drawing similar to FIG. 1, and illustrates a ninth example of an embodiment of the present invention.
Figure 25:
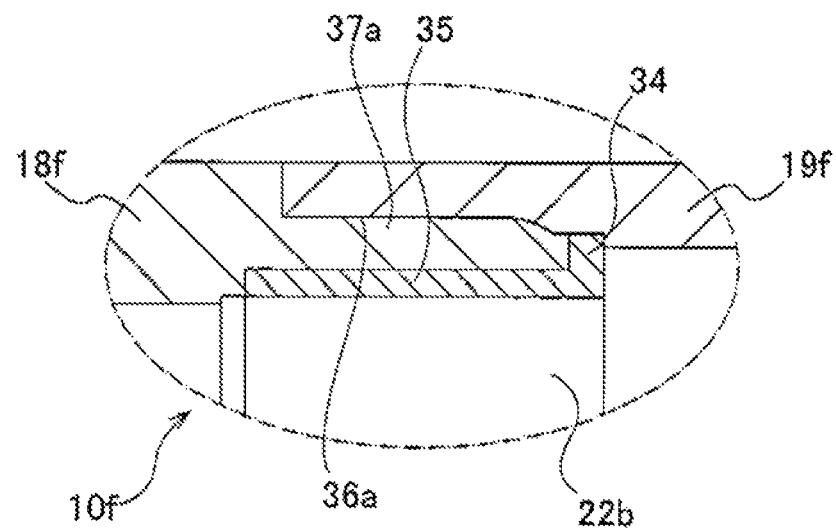
FIG. 25 is an enlarged view of part "h" in FIG. 24.

FIG. 24 and FIG. 25 illustrate a ninth example of an embodiment of the present invention. In this example, a flange section 34 that protrudes outward in the radial direction is provided on the rear end section of the ring 22d, and the outer circumferential surface of this flange section 34 fits and fastens inside the portion near the front end that adjoins the front end section of the cylindrical member 19f. The rear end section of the main portion 18f is held between a small-diameter section 35 that is formed from the middle section to the front end section of the ring 22d and the front end section of the cylindrical member 19f, and the main portion 18f and the cylindrical member 19f are connected in the axial direction, forming the outer column 10f. Moreover, in this example, concave grooves 36a are formed at one or a plurality of locations in the circumferential direction on the inner circumferential surface of the front end section of the cylindrical member 19f, and by protrusions 37a that are formed on the outer circumferential direction of the rear end section of the main portion 18f engaging with the concave grooves 36a, the connecting strength in the circumferential direction between the main portion 18f and the cylindrical member 19f is maintained.

Figure 29:
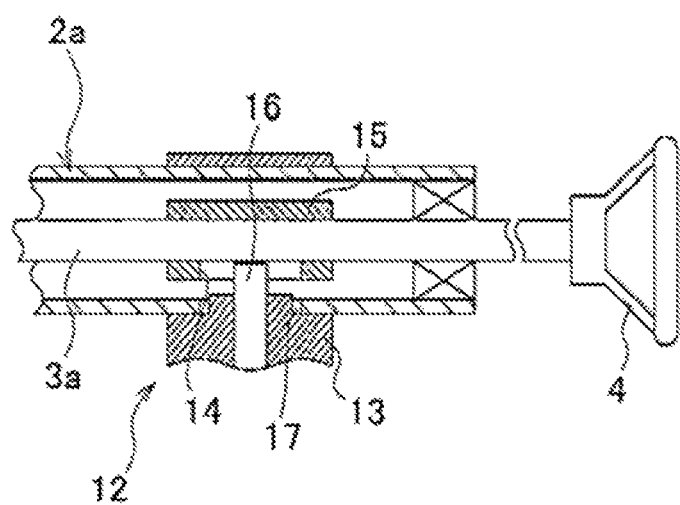
FIG. 29 is a cross-sectional view of an example of conventional construction of a steering lock apparatus.
Figure 30:
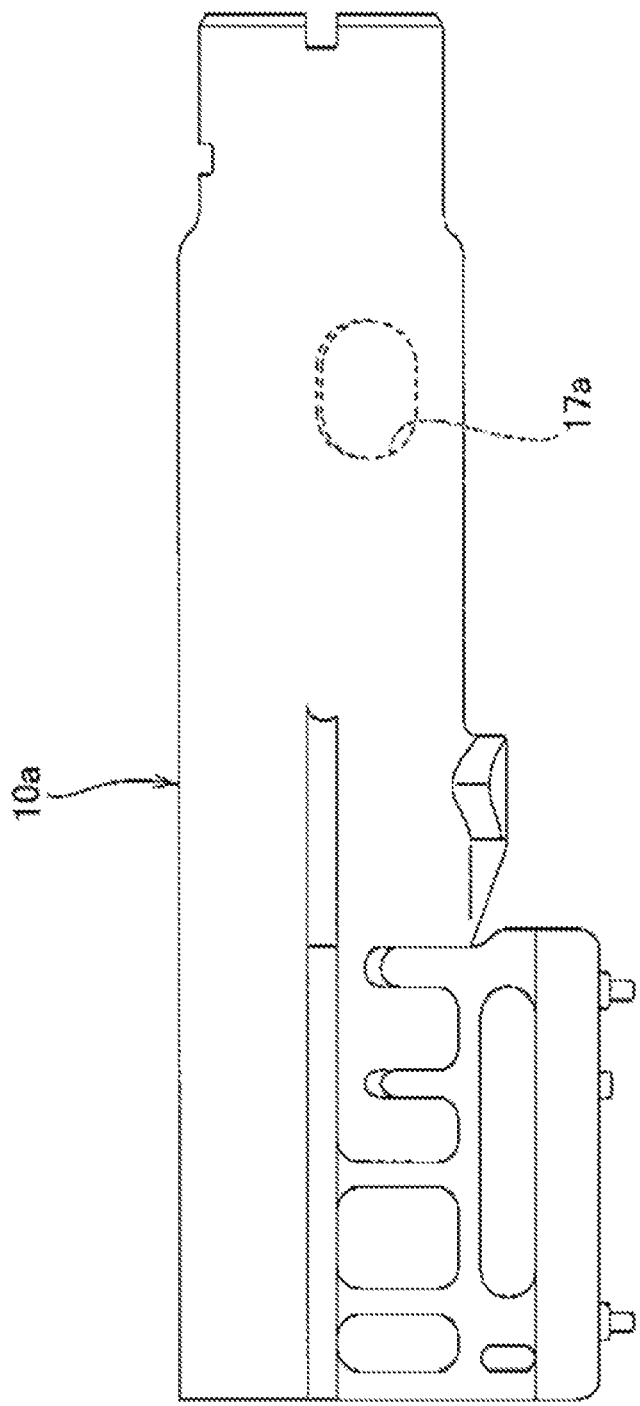
FIG. 30 is a side view illustrating an example of conventional construction of a steering column that is provide with a lock through hole.

In this example, the inner diameter of the cylindrical member 19f can be made larger than the inner diameter of the main portion 18f, so it is possible to easily maintain a gap on the inner diameter side of the cylindrical member 19f for providing a key-lock collar 13 (see FIG. 29). The construction and functions of the other parts of this ninth example are the same as in the fifth example of the embodiment.

Example 10

Figure 26:
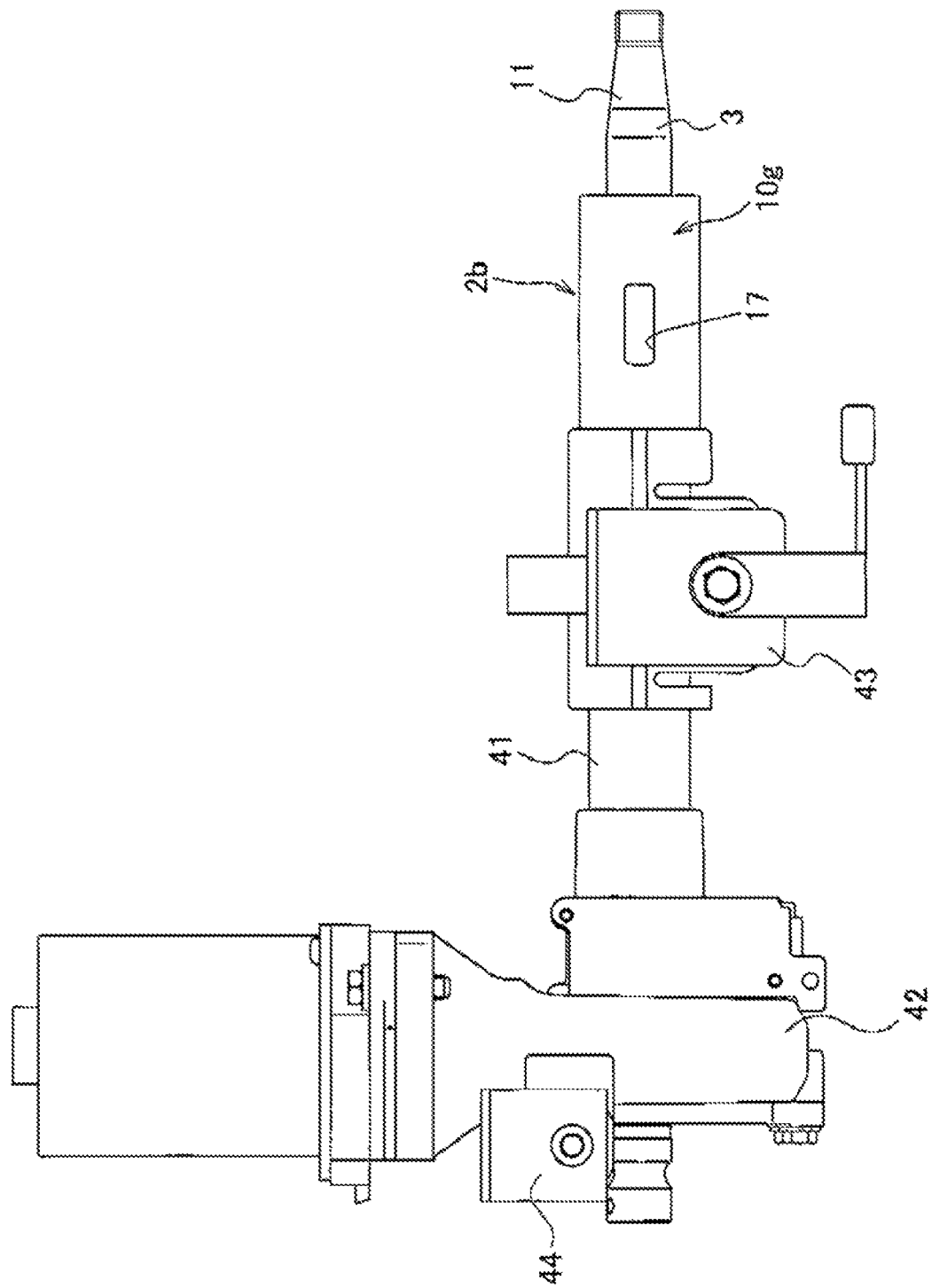
FIG. 26 is a side view illustrating a steering apparatus of a tenth example of an embodiment of the present invention.
Figure 27:
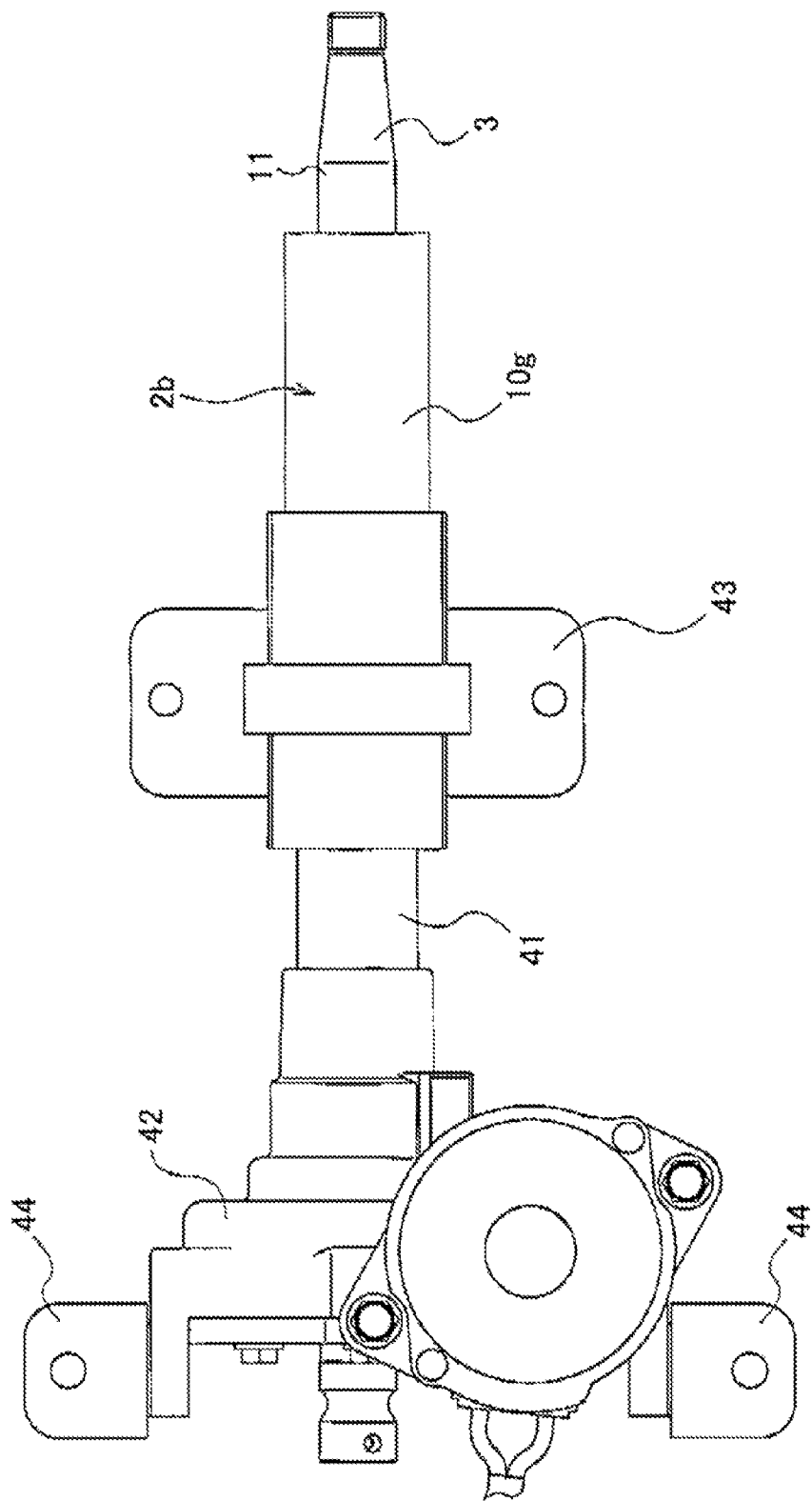
FIG. 27 is a top view as seen from above in FIG. 26.

FIG. 26 and FIG. 27 illustrate a tenth example of an embodiment of the present invention. This example is an example of a steering apparatus of the present invention. This steering apparatus is a shock absorbing steering apparatus that comprises a telescopic mechanism. In this steering apparatus, the rear end section of an inner column 41 fits inside the front end section of an outer column 10g in a state such that the outer column 10g and the inner column 41 displace in the axial direction with respect to each other. A housing 42 for housing a reduction gear of an electric power-steering apparatus is connected and fastened to the front end section of the inner column 41. This kind of steering column 2b is supported by the vehicle body by connecting and fastening a rear side bracket 43 that supports the outer column 10f and front side brackets 44 that provided on both the left and right sides of the front end section of the housing 42 to the vehicle body. In this example, a steering column that includes any one of the column members of the first through ninth examples of an embodiment of the present invention is used as the outer column 10g of the steering column 2b.

Figure 28:
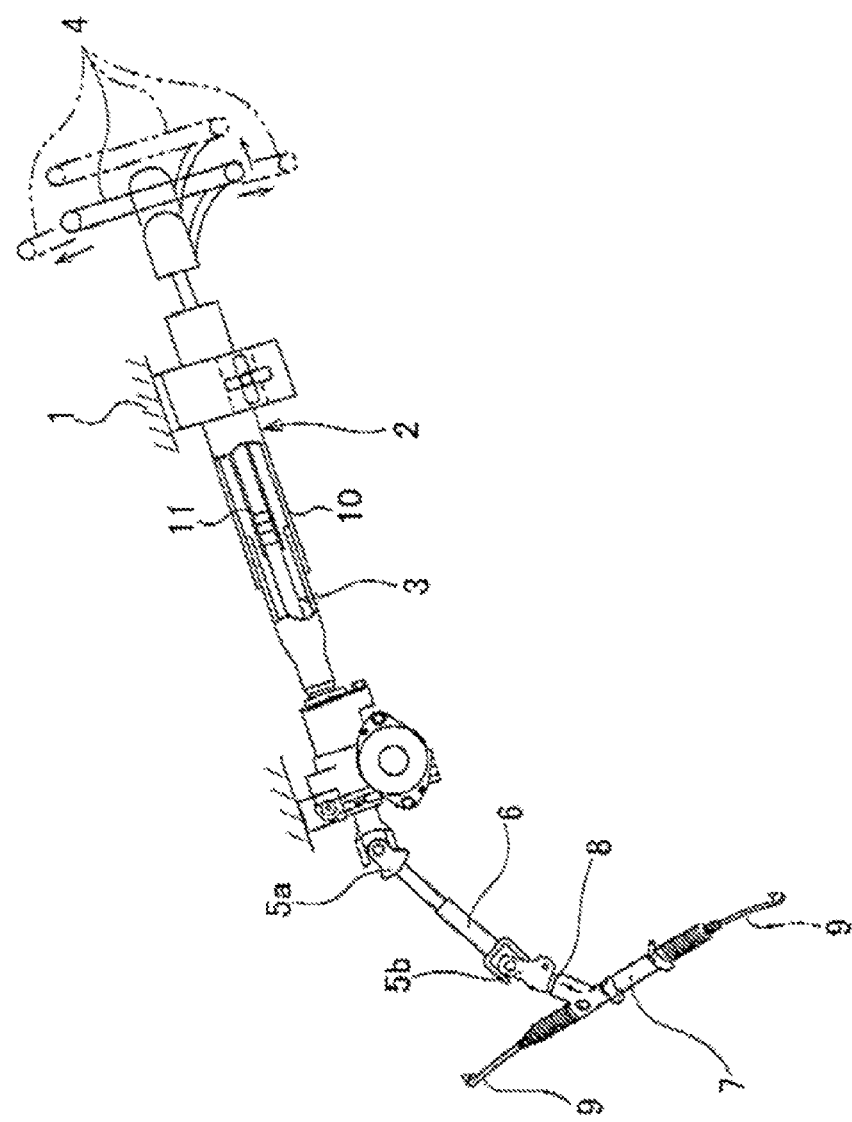
FIG. 28 is a perspective view illustrating an example of a conventionally known steering apparatus with part removed.

In the steering apparatus of this example, a steering lock apparatus as illustrated in FIG. 29 is assembled. When operating the steering lock, the steering shaft 3 is essentially prevented from rotating on the inside of the steering column 2b. Being essentially prevented means that when an engaging concave section 14 is engaged with the tip end section of a locking pin 16 (see FIG. 29), and the steering wheel 4 (see FIG. 28) is rotated with a specified force or greater (a force that exceeds a value specified by key-lock regulations), the steering shaft 3 is allowed to rotate not only with respect to the key-lock collar 15, but also with respect to the steering column 2b. However, the steering shaft 3 does not rotate when the steering wheel 4 is operated with a force in normal operating posture for applying a desired steering angle to the steered wheels.

The present invention can be applied to not only the case of construction comprising a telescopic mechanism that is composed of a steering column having an outer column and an inner column, but also construction wherein the steering column is composed of a single column member and does not comprise a telescopic mechanism. In that case, the entire steering column is constructed by the single column member and a portion of the single column member that is near the rear end where, for example, a steering lock apparatus is located can be constructed by the cylindrical member of the present invention and connected in the axial direction with another main portion. In addition, the present invention includes construction wherein the cylindrical member is connected to the front of the main portion, and construction wherein a cylindrical member is connected to both side of the main portion.

EXPLANATION OF REFERENCE NUMBERS

1 Vehicle body
2, 2a, 2b Steering column
3, 3a Steering shaft
4 Steering wheel
5a, 5b Universal joint
6 Intermediate shaft
7 Steering gear unit
8 Input shaft
9 Tie rod
10, 10a to 10g Outer column
11 Outer tube
12 Steering lock apparatus
13 Lock unit
14 Engaging concave section
15 Key-lock collar
16 Locking pin
17, 17a Lock through hole
18, 18a to 18f Main portion
19, 19a to 19f Cylindrical member
20, 20a Concave groove
21, 21a Protrusion
22, 22a to 22e Ring
23 Die
24 Outside surface
25 Insertion hole
26 Stepped section
27 Stepped section
28 Core cylinder
29 Tip end section 30 Base end section
31 Stepped surface
32 Concave section
33 Convex section
34 Flange section
35 Small-diameter section
36, 36a Concave groove
37, 37a Protrusion
38 Uneven section
39 Flange section
40 Cylindrical section
41 Inner column
42 Housing
43 Rear side bracket
44 Front side bracket

What is claimed is:

1. A manufacturing method of a steering column having a cylindrical shape as a whole and comprising a column member, the column member comprising:
a main portion that is made using a light metal alloy, and comprises a convex section provided at one location or more in the circumferential direction on a circumferential surface on one end thereof;
a cylindrical member that is made using an iron-based alloy, and comprises a concave section at one location or more in the circumferential direction on a circumferential surface on one end thereof that faces the circumferential surface of the main portion, and together with fitting with the main portion, is connected in the axial direction to the main portion by the engagement of the convex section and concave section; and
a ring that is made using a metal material, and is fitted and fastened on an inner diameter side of a connecting section between the main portion and the cylindrical member, the manufacturing method of the steering column comprising the steps of:
fitting the ring inside the one end of the cylindrical member;
inserting the one end of the cylindrical member into an insertion through hole that is open on an end surface of a die to protrude the one end of the cylindrical member inside the die;
inserting an end section of a core cylinder into the ring; and
feeding molten light metal alloy into the die to form the main portion and causing part of the molten light metal alloy to enter into the concave section to form the convex section on the circumferential surface of the main portion.

2. The manufacturing method of a steering column according to claim 1, wherein the main portion is formed so that the inner diameter of the ring is smaller than the inner diameter of the main portion, and the inner diameter of the cylindrical member is larger than the inner diameter of the main portion that is separated in the axial direction from the connection section with the cylindrical member, and wherein, after the main portion has been formed, machining is performed on the inner diameter side of the ring so that the inner diameter of the ring is equal to or greater than the inner diameter of the portion of the main portion that is separated in the axial direction from the connecting section with the cylindrical member, and is equal to or less than the inner diameter of the cylindrical member.

* * * * *